US007403888B1

(12) United States Patent
Wang et al.

(10) Patent No.: US 7,403,888 B1
(45) Date of Patent: *Jul. 22, 2008

(54) LANGUAGE INPUT USER INTERFACE

(75) Inventors: Jian Wang, Beijing (CN); Gao Zhang, Beijing (CN); Jian Han, Beijing (CN); Zheng Chen, Beijing (CN); Xianoning Ling, Bellevue, WA (US); Kai-Fu Lee, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1284 days.

This patent is subject to a terminal disclaimer.

(21) Appl. No.: 09/606,811

(22) Filed: Jun. 28, 2000

Related U.S. Application Data

(60) Provisional application No. 60/163,588, filed on Nov. 5, 1999.

(51) Int. Cl.
*G10L 11/00* (2006.01)
(52) U.S. Cl. .......................................... 704/2; 704/277
(58) Field of Classification Search ................ 704/2, 704/270, 277
See application file for complete search history.

(56) References Cited

U.S. PATENT DOCUMENTS

| 4,383,307 | A |   | 5/1983  | Gibson, III          |       |
|-----------|---|---|---------|----------------------|-------|
| 4,791,587 | A | * | 12/1988 | Doi .................. | 704/2 |
| 4,800,522 | A | * | 1/1989  | Miyao et al. ........ | 704/2 |
| 4,833,610 | A | * | 5/1989  | Zamora et al. ....... | 707/5 |
| 4,864,503 | A | * | 9/1989  | Tolin ................ | 704/2 |
| 5,095,432 | A |   | 3/1992  | Reed                 |       |
| 5,175,803 | A |   | 12/1992 | Yeh                  |       |
| 5,214,583 | A | * | 5/1993  | Miike et al. ........ | 704/4 |

(Continued)

FOREIGN PATENT DOCUMENTS

EP   0 555 545   12/1992

(Continued)

OTHER PUBLICATIONS

Camarda et al., "Entering Asian Text with Input Method Editors"; Using Word 2000, Chapter 26.

(Continued)

*Primary Examiner*—Michael Opsasnick
(74) *Attorney, Agent, or Firm*—Lee & Hayes, PLLC

(57) ABSTRACT

A language input architecture receives input text (e.g., phonetic text of a character-based language) entered by a user from an input device (e.g., keyboard, voice recognition). The input text is converted to an output text (e.g., written language text of a character-based language). The language input architecture has a user interface that displays the output text and unconverted input text in line with one another. As the input text is converted, it is replaced in the UI with the converted output text. In addition to this in-line input feature, the UI enables in-place editing or error correction without requiring the user to switch modes from an entry mode to an edit mode. To assist with this in-place editing, the UI presents pop-up windows containing the phonetic text from which the output text was converted as well as first and second candidate lists that contain small and large sets of alternative candidates that might be used to replace the current output text. The language input user interface also allows a user to enter a mixed text of different languages.

35 Claims, 27 Drawing Sheets

U.S. PATENT DOCUMENTS

| | | | |
|---|---|---|---|
| 5,218,536 A | 6/1993 | McWherter | |
| 5,258,909 A | 11/1993 | Damerau et al. | |
| 5,278,943 A * | 1/1994 | Gasper et al. | 704/200 |
| 5,319,552 A | 6/1994 | Zhong | |
| 5,384,701 A * | 1/1995 | Stentiford et al. | 704/3 |
| 5,510,998 A | 4/1996 | Woodruff et al. | |
| 5,521,816 A | 5/1996 | Roche et al. | |
| 5,535,119 A | 7/1996 | Ito et al. | |
| 5,568,383 A * | 10/1996 | Johnson et al. | 704/2 |
| 5,572,423 A | 11/1996 | Church | |
| 5,594,642 A * | 1/1997 | Collins et al. | 715/535 |
| 5,646,840 A * | 7/1997 | Yamauchi et al. | 704/2 |
| 5,652,898 A | 7/1997 | Kaji | |
| 5,671,426 A | 9/1997 | Armstrong, III | |
| 5,704,007 A * | 12/1997 | Cecys | 704/260 |
| 5,715,469 A | 2/1998 | Arning | |
| 5,732,276 A * | 3/1998 | Komatsu et al. | 704/1 |
| 5,774,834 A | 6/1998 | Visser | |
| 5,781,884 A | 7/1998 | Pereira et al. | |
| 5,806,021 A | 9/1998 | Chen et al. | |
| 5,835,924 A | 11/1998 | Maruyama et al. | |
| 5,893,133 A | 4/1999 | Chen | 707/535 |
| 5,907,705 A * | 5/1999 | Carter | 717/122 |
| 5,930,755 A * | 7/1999 | Cecys | 704/260 |
| 5,933,525 A | 8/1999 | Makhoul et al. | |
| 5,956,739 A | 9/1999 | Golding et al. | |
| 5,970,492 A | 10/1999 | Nielsen | |
| 5,974,371 A * | 10/1999 | Hirai et al. | 704/2 |
| 5,974,413 A * | 10/1999 | Beauregard et al. | 707/6 |
| 5,987,403 A * | 11/1999 | Sugimura | 704/2 |
| 6,047,300 A | 4/2000 | Walfish et al. | |
| 6,073,146 A | 6/2000 | Chen | |
| 6,131,102 A | 10/2000 | Potter | |
| 6,148,285 A * | 11/2000 | Busardo | 704/260 |
| 6,154,758 A | 11/2000 | Chiang | 707/541 |
| 6,173,252 B1 | 1/2001 | Qiu et al. | |
| 6,204,848 B1 * | 3/2001 | Nowlan et al. | 715/810 |
| 6,219,646 B1 * | 4/2001 | Cherny | 704/277 |
| 6,256,630 B1 | 7/2001 | Gilai et al. | |
| 6,356,866 B1 * | 3/2002 | Pratley et al. | 704/9 |
| 6,374,210 B1 | 4/2002 | Chu | |
| 6,393,388 B1 * | 5/2002 | Franz et al. | 704/4 |
| 6,401,065 B1 * | 6/2002 | Kanevsky et al. | 704/256.4 |
| 6,487,533 B2 | 11/2002 | Hyde-Thomson et al. | |
| 6,490,563 B2 * | 12/2002 | Hon et al. | 704/260 |
| 6,573,844 B1 | 6/2003 | Venolia et al. | |
| 6,646,572 B1 | 11/2003 | Brand | |
| 6,848,080 B1 * | 1/2005 | Lee et al. | 715/533 |
| 7,047,493 B1 | 5/2006 | Brill et al. | |
| 7,076,731 B2 | 7/2006 | Brill et al. | |
| 7,191,393 B1 * | 3/2007 | Chin et al. | 715/513 |

FOREIGN PATENT DOCUMENTS

| | | |
|---|---|---|
| GB | 2158776 | 11/1985 |
| GB | 2248328 | 4/1992 |
| WO | WO 95/17729 | 6/1995 |
| WO | WO 00/10101 | 2/2000 |

OTHER PUBLICATIONS

Yuan et al., "A Neural Network for Disambiguating Pinyin Chinese Input"; Calico '94 Annual Symposium, Northern Arizona University, Mar. 14-18, 1994; pp. 239-243.

Brill, et al., "An Improved Error Model for Noisy Channel Spelling Correction", p. 8.

Church, et al., "Probability scoring for spelling correction", Satistics and Computing, vol. 1, 1991, Chapman & Hall, pp. 93-104.

* cited by examiner

| User Input | UI Screen Shots |
|---|---|
| Move the cursor to the front of the character text needed to be corrected — 2302 | 先是位于我国山西省的中部 — 2312 |
| Press ESC key to show the candidate list — 2304 | 0:xian'shi — 2332<br>先是位于我国山西省的中部 — 2314<br>1:现实 — 2334<br>2:现时<br>3:显示<br>4:现世<br>5:闲适<br>6:先世<br>— 2336 |
| Press '0' to enter the pinyin editor state — 2306 | 0:xian'shi — 2332<br>xian'shi位于我国山西省的中部 — 2316<br>1:先是<br>2:现实 — 2334<br>3:现时<br>4:显示<br>5:现山<br>6:闲适<br>— 2336' |
| Add a "'" before 'an ' to do word segmentation — 2308 | 0:xi'an'shi — 2332<br>xi'an'shi位于我国山西省的中部 — 2318<br>1:西安市 — 2338<br>— 2334 |
| Select the desired character text — 2310 | 西安市位于我国山西省的中部 — 2320<br>— 2338 |

Fig. 23

| User Input | UI Screen Shots |
|---|---|
| Womenxihuanshiyong Microsoft | 我们喜欢使用Microsoft| |
| Chupindewordzichuliruanjian | 我们喜欢使用Microsoft出品的word字处理软件, | |

Fig. 24

LANGUAGE INPUT USER INTERFACE

RELATED CASES

The present application claims benefit of U.S. Provisional Application No. 60/163,588, filed Nov. 5, 1999.

The present application is also co-pending with U.S. patent application Ser. No. 09/606,660, filed concurrently herewith on Jun. 28, 2000, entitled "Language Input Architecture For Converting One Text Form to Another Text Form With Tolerance To Spelling, Typographical, And Conversion Errors" and U.S. patent application Ser. No. 09/606,807, filed concurrently herewith on Jun. 28, 2000, entitled "Language Input Architecture For Converting One Text Form to Another Text Form With Modeless Entry". Both of these co-pending applications are incorporated herein by reference.

TECHNICAL FIELD

The present invention relates to a language input user interface. More particularly, the present invention relates to a language input user interface that may be used in language-specific or multilingual word processing systems, email systems, browsers, and the like, where phonetic text is input and converted to language text.

BACKGROUND

Language-specific word processing systems that utilize alphanumeric keyboards (e.g. the English QWERTY keyboard) have existed for many years. Alphanumeric keyboards work well for languages that employ a small alphabet, such as the Roman character set. Unfortunately, not all languages have a small character base. For instance, character-based languages (also referred to as symbol languages), such as Chinese, Japanese, Korean, and the like, may have thousands of characters. Language specific keyboards do not exist for character-based languages because it is practically impossible to build a keyboard to support separate keys for so many different characters.

Rather than designing expensive language and dialect-specific keyboards, language-specific word processing systems allow the user to enter phonetic text from a small character-set keyboard (e.g., a QWERTY keyboard) and convert that phonetic text to language text of a character-based language. "Phonetic text" represents the sounds made when speaking a given language, whereas the "language text" represents the actual written characters as they appear in the text. In the Chinese language, for example, Pinyin is an example of phonetic text and Hanzi is an example of the language text. Typically, the set of characters needed to express the phonetic text is much smaller than the character set used to express the language text. By converting the phonetic text to language text, many different languages can be processed by the language specific word processor using conventional computers and standard QWERTY keyboards.

To facilitate user entry of phonetic text, language-specific word processing systems often employ a language input user interface (UI). Existing language input UIs, however, are not very user friendly because they are not easy to learn and they do not accommodate a fast typing speed. As an example of such unfriendliness, some conventional language input user interfaces disassociate the phonetic text input from the converted language text output. For instance, a user may enter phonetic text in one location on the visual display screen and the converted characters of the language text are presented in a separate and distinct location on the screen. The two locations may even have their own local cursor. This dual presentation can be confusing to the user in terms of where entry is actually taking place. Moreover, the user must continuously glance between the locations on the screen.

As a result, existing language input UIs are often only used by professional typists, not by everyday personal computer (PC) users. In character-based language countries, these concerns have a significant affect on the popularity of PC use.

In general, there are two types of language input user interfaces: (1) a code-based user interface and (2) a mode-based user interface. In a code-based user interface, users memorize codes related to words of the language. The codes are input by way of an input device and converted to the desired language text. This type of user interface allows users to input text very fast once they have memorized the codes. However, these codes are often not easy to memorize, but are easy to forget.

In a mode-based user interface, phonetic text is input and converted to the desired language text. Mode-based user interfaces do not require users to memorize codes, but typically require users to switch modes between inputting and editing language text. One example of a mode-based user interface is employed in Microsoft's "Word"-brand word processing program that is adapted for foreign languages by utilizing phonetic-to-language conversion, such as Chinese. When entering phonetic text in the "Word" program, a user is presented with a localized tool bar that enables the user to switch between an inputting mode in which a user inputs phonetic characters (e.g., Chinese Pinyin) and an editing mode in which a user corrects inevitable errors that occasionally occur as a result of the recognition and conversion process.

One drawback with such traditional interfaces is that users must be aware of the current mode—input or edit—and take additional steps that are extraneous to text entry (i.e., clicking a tool bar control button) to switch between the modes. This interface thus causes extra work for the user and diverts the user's attention from text entry to others peripheral control aspects, thereby significantly reducing input speed.

Another problem associated with mode-based user interfaces concerns how to handle, from a user interface perspective, the inevitable conversion errors. A conversion error occurs when the recognition and conversion engine converts the phonetic text into an incorrect language character. This may be quite common due to the nature of a given language and the accuracy at which the phonetic text can be used to predict an intended character. After the user converts to the editing mode, the user interface typically provides some way for the user to correct the character. In Microsoft's "Word"-brand word processing program for China, for example, a user is presented with a box containing possible alternative characters. If the list is long, the box provides controls to scroll through the list of possible characters.

Another drawback of traditional mode-based user interfaces is that they require mode switching for inputting different languages. When a user is inputting phonetic text and wants to input text of a second language, the user has to switch modes to input the second language. For instance, in the context of Microsoft "Word", the localized tool bar offers a control button that enables a user to toggle between entry of a first language (e.g., Chinese Pinyin) and entry of a second language (e.g., English). The user must consciously activate the control to inform the word recognition engine of the intended language.

Another concern related to a language input UI, particularly from the perspective of non-professional typists, is typing errors. The average user of phonetic text input UIs is particularly prone to entering typographic typing errors. One reason for the typing errors is that users from different geographic regions often use different dialects of a character-based language. Users misspell phonetic text due to their local dialects. A slight deviation in phonetic text can result in entirely different character text.

Accordingly, there is a need for an improved language input user interface.

SUMMARY

The present invention concerns a language input user interface that intelligently integrates phonetic text entered by a user and language text converted from the phonetic text into the same screen area. The user interface is modeless in that it does not require a user to switch between input and edit modes. The modeless user interface also accommodates entry of multiple languages without requiring explicit mode switching among the languages. As a result, the user interface is intuitive for users, easy to learn, and is user friendly.

In one implementation, the language input user interface (UI) includes an in-line input feature that integrates phonetic text with converted language text. In particular, the phonetic text being input by a user is displayed in the same line concurrently with previously entered phonetic text and previously converted language text. Displaying input phonetic text in the same line with the previously converted language text allows users to focus their eyes in the same line, thereby making for a more intuitive and natural user interface.

The language input UI supports language text editing operations including: 1) adding language text; 2) deleting language text; and 3) replacing selected language text with one or more replacement language text candidates. The user interface allows a user to select language text and replace it by manually typing in new phonetic text that can then be converted to new language text. Alternatively, the user interface provides one or more lists of language text candidates. A floating list is first presented in conjunction with the selected language text to be changed. In this manner, language text candidates are presented in-place within the sentence structure to allow the user to visualize the corrections in the grammatical context. The list of candidates is presented in a sorted order according to a rank or score of the likelihood that the choice is actually the one originally intended by the user. The hierarchy may be based on probability, character strokes, or other metrics. The top candidate is the one that gives the sentence the highest score, followed by the second candidate that gives the sentence the next highest score, and so on.

As the user scrolls through the list, the list is updated within the context menu. Additionally, the currently visual choices are shown in animated movement in the direction of the scrolling action. The animation helps the user ascertain how much or how fast the list is being scrolled. Once the user selects the replacement text, it is inserted in place of the language text within the sentence, allowing the user to focus on a single line being edited.

Another feature of the language input UI is that it allows the user to view previously input phonetic text for the language text being edited. The user can select the previously input phonetic text and upon selection, the previously input phonetic text is displayed in place of the language text. The phonetic text can then be edited and converted to new language text.

Another feature of the language input user interface is a sentence-based automatic conversion feature. In a sentence-based automatic conversion, previously converted language text within a sentence may be further converted automatically to different language text after inputting subsequent phonetic text. Once a sentence is complete, as indicated by a period, the language text in that sentence becomes fixed and is not further converted automatically to different language text as a result of entering input text in a subsequent sentence. It is appreciated that a phrase-based or similar automatic conversion can be used in an alternative embodiment.

Another feature of the language input user interface is sentence-based automatic conversion with language text confirmation. After phonetic text is converted to language text, a user can confirm the just converted language text so that the just converted language text will not be further converted automatically in view of the context of the sentence.

Another feature of the language input user interface is the ability to handle multiple languages without switching modes. Words or symbols of a second language, when intermixed with the phonetic text, are treated as special language input text and displayed as the second language text. Thus, users are not required to switch modes when inputting different languages.

These and various other features as well as advantages which characterize the present invention will be apparent from reading the following detailed description and a review of the associated drawings.

BRIEF DESCRIPTION OF THE DRAWINGS

The same numbers are used throughout the Figures to reference like components and features.

FIG. 2 illustrates an in-line input feature of the language input UI.

FIG. 23 illustrates exemplary user inputs and resulting screen shots of an exemplary Chinese input user interface, which shows an example of an in-place Pinyin text correction feature.

FIG. 24 illustrates exemplary user inputs and resulting screen shots of an exemplary Chinese input user interface, which shows an example of a mixture input of English/Chinese language feature.

DETAILED DESCRIPTION

The present invention concerns a language input user interface that facilitates phonetic text input and conversion to language text. For discussion purposes, the invention is described in the general context of word processing programs executed by a general-purpose computer. However, the invention may be implemented in many different environments other than word processing (e.g., email systems, browsers, etc.) and may be practiced on many diverse types of devices.

System Architecture

Figure 1:
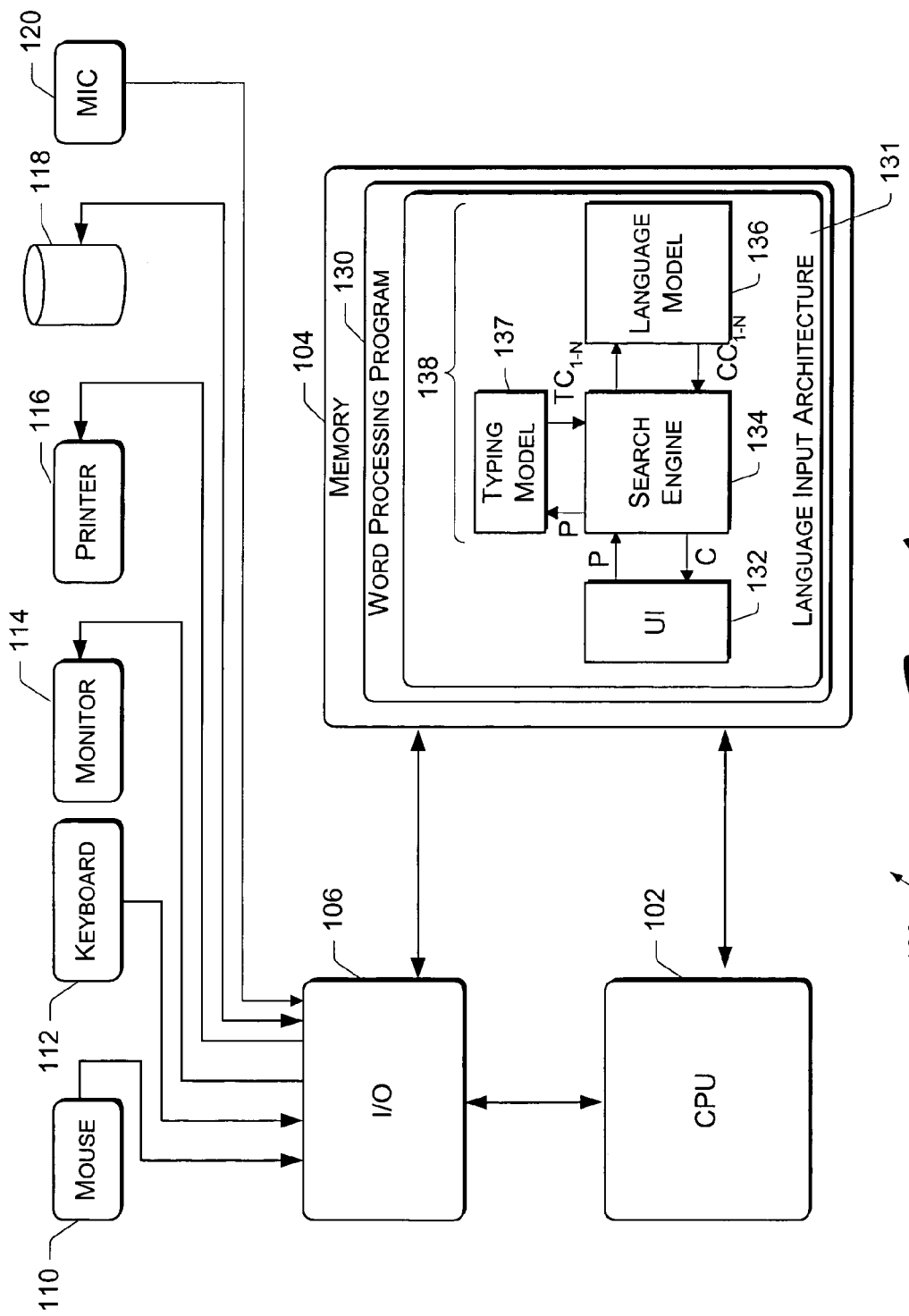
FIG. 1 is a block diagram of a computer system having a language-specific word processor that implements a language input architecture. The language input architecture includes a language input user interface (UI).

FIG. 1 shows an exemplary computer system 100 having a central processing unit (CPU) 102, a memory 104, and an input/output (I/O) interface The CPU 102 communicates with the memory 104 and I/O interface 106. The memory 104 is representative of both volatile memory (e.g., RAM) and non-volatile memory (e.g., ROM, hard disk, etc.).

The computer system 100 has one or more peripheral devices connected via the I/O interface 106. Exemplary peripheral devices include a mouse 110, a keyboard 112 (e.g., an alphanumeric QWERTY keyboard, a phonetic keyboard, etc.), a display monitor 114, a printer 116, a peripheral storage device 118, and a microphone 120. The computer system may be implemented, for example, as a general-purpose computer. Accordingly, the computer system 100 implements a computer operating system (not shown) that is stored in memory 104 and executed on the CPU 102. The operating system is preferably a multi-tasking operating system that supports a windowing environment. An example of a suitable operating system is a Windows brand operating system from Microsoft Corporation.

It is noted that other computer system configurations may be used, such as hand-held devices, multiprocessor systems, microprocessor-based or programmable consumer electronics, network PCs, minicomputers, mainframe computers, and the like. In addition, although a standalone computer is illustrated in FIG. 1, the language input UI may be practiced in distributed computing environments where tasks are performed by remote processing devices that are linked through a communications network (e.g., LAN, Internet, etc.). In a distributed computing environment, program modules may be located in both local and remote memory storage devices.

A data or word processing program 130 is stored in memory 104 and executes on CPU 102. Other programs, data, files, and such may also be stored in memory 104, but are not shown for ease of discussion. The word processing program 130 is configured to receive phonetic text and convert it automatically to language text. More particularly, the word processing program 130 implements a language input architecture 131 that, for discussion purposes, is implemented as computer software stored in memory and executable on a processor. The word processing program 130 may include other components in addition to the architecture 131, but such components are considered standard to word processing programs and will not be shown or described in detail.

The language input architecture 131 of word processing program 130 has a user interface (UI) 132, a search engine 134, a language model 136, and a typing model 137. The architecture 131 is language independent. The UI 132 and search engine 134 are generic and can be used for any language. The architecture 131 is adapted to a particular language by changing the language model 136 and the typing model 137. A more detailed discussion of the architecture is found in co-pending application Ser. No. 09/606,660, entitled "Language Input Architecture For Converting One Text Form to Another Text Form With Tolerance To Spelling, Typographical, And Conversion Errors" and Ser. No. 09/606,807, entitled "Language Input Architecture For Converting One Text Form to Another Text Form With Modeless Entry", which are incorporated herein by reference.

The search engine 134, language module 136, and typing model 137 together form a phonetic text-to-language text converter 138. For purposes of this disclosure, "text" means one or more characters and/or non-character symbols. "Phonetic text" generally refers to an alphanumeric text representing sounds made when speaking a given language. A "language text" is the characters and non-character symbols representative of a written language. "Non-phonetic text" is alphanumeric text that does not represent sounds made when speaking a given language. Non-phonetic text might include punctuation, special symbols, and alphanumeric text representative of a written language other than the language text.

Figure 27:
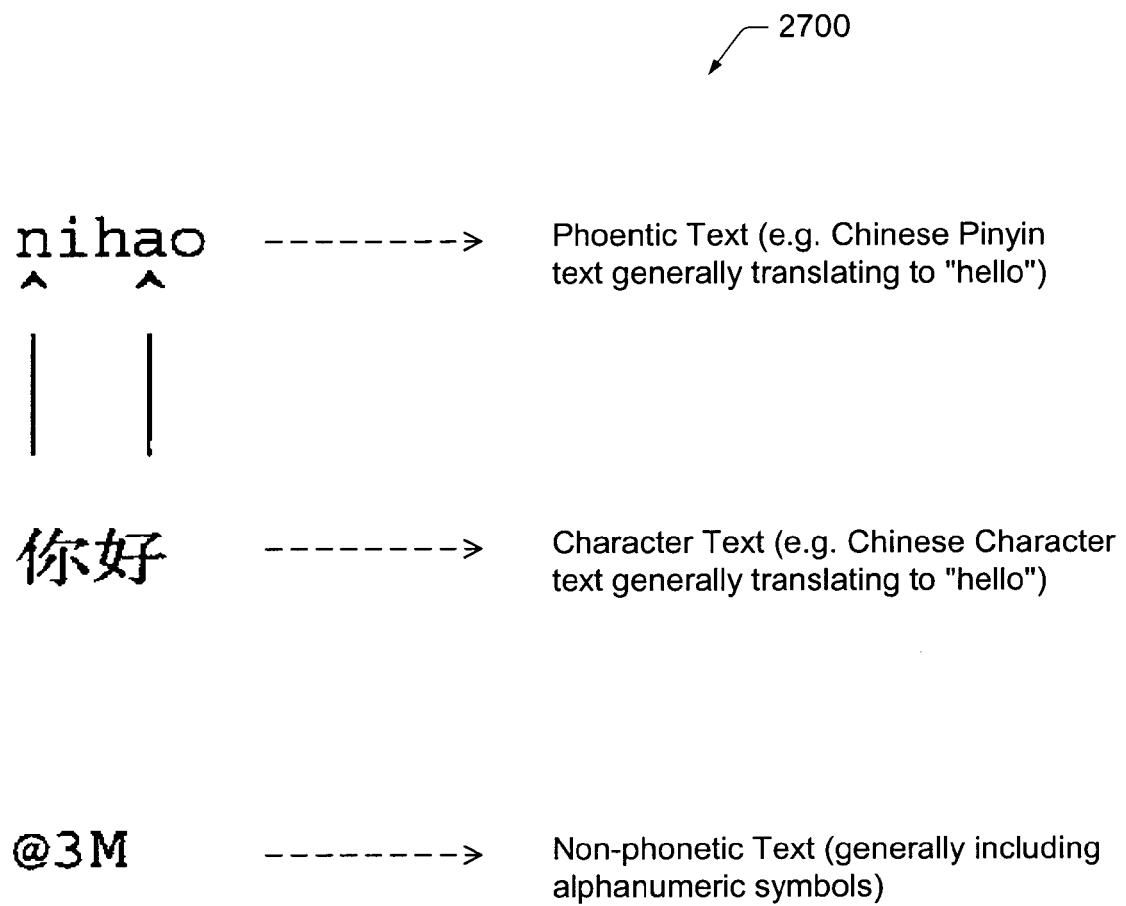
FIG. 27 illustrates a definition of phonetic text (e.g. Chinese Pinyin text) and its corresponding character text (e.g. Chinese character text), and a definition of non-phonetic text (e.g. alphanumeric text).

FIG. 27 shows an example of phonetic text, converted language text, and non-phonetic text. In this example, the phonetic text is Chinese Pinyin text, which is translated to "hello". The exemplary character text is Chinese Hanzi text, which also translated to "hello". The exemplary non-phonetic text is a string of alphanumeric symbol text "@3m". For discussion purposes, word processor 130 is described in the context of a Chinese-based word processor and the language input architecture 131 is configured to convert Pinyin to Hanzi. That is, the phonetic text is Pinyin and the language text is Hanzi.

However, the language input architecture is language independent and may be used for other languages. For example, the phonetic text may be a form of spoken Japanese, whereas the language text is representative of a Japanese written language, such as Kanji. Many other examples exist including, but not limited to, Arabic languages, Korean language, Indian language, other Asian languages, and so forth.

Perhaps more generally stated, phonetic text may be any alphanumeric text represented in a Roman-based character set (e.g., English alphabet) that represents sounds made when speaking a given language that, when written, does not employ the Roman-based character set. Language text is the written symbols corresponding to the given language.

Phonetic text is entered via one or more of the peripheral input devices, such as the mouse 110, keyboard 112, or microphone 120. In this manner, a user is permitted to input phonetic text using keyed entry or oral speech. In the case of oral input, the computer system may further implement a speech recognition module (not shown) to receive the spoken words and convert them to phonetic text. The following discussion assumes that entry of text via keyboard 112 is performed on a full size, standard alphanumeric QWERTY keyboard.

The UI 132 displays the phonetic text as it is being entered. The UI is preferably a graphical user interface. The user interface 132 passes the phonetic text (P) to the search engine 134, which in turn passes the phonetic text to the typing model 137. The typing model 137 generates various typing candidates ($TC_1, \ldots, TC_N$) that might be suitable edits of the phonetic text intended by the user, given that the phonetic text may include errors. The typing model 137 returns the typing candidates to the search engine 13, which passes them onto the language model 136. The language model 136 generates various conversion candidates ($CC_1, \ldots, CC_N$) written in the language text that might be representative of a converted form of the phonetic text intended by the user. The conversion candidates are associated with the typing candidates. Conversion from phonetic text to language text is not a one-for-one conversion. The same or similar phonetic text might represent a number of characters or symbols in the language text. Thus, the context of the phonetic text is interpreted before conversion to language text. On the other hand, conversion of non-phonetic text will typically be a direct one-to-one conversion wherein the alphanumeric text displayed is the same as the alphanumeric input.

The conversion candidates ($CC_1, \ldots, CC_N$) are passed back to the search engine 134, which performs statistical analysis to determine which of the typing and conversion candidates exhibit the highest probability of being intended by the user. Once the probabilities are computed, the search engine 134 selects the candidate with the highest probability and returns the language text of the conversion candidate to the UI 132. The UI 132 then replaces the phonetic text with the language text of the conversion candidate in the same line of the display. Meanwhile, newly entered phonetic text continues to be displayed in the line ahead of the newly inserted language text.

If the user wishes to change language text from the one selected by the search engine 134, the user interface 132 presents a first list of other high probability candidates ranked in order of the likelihood that the choice is actually the intended answer. If the user is still dissatisfied with the possible candidates, the UI 132 presents a second list that offers all possible choices. The second list may be ranked in terms of probability or other metric (e.g., stroke count or complexity in Chinese characters).

Language Input User Interface

The remaining discussion is particularly directed to features of the user interface 132. In particular, the user interface 132 visually integrates the display of inputted phonetic text along with converted language text in the same line on the screen. Many of the features are described in the context of how they visually appear on a display screen, such as presence and location of a window or a menu or a cursor. It is noted that such features are supported by the user interface 132 alone or in conjunction with an operating system.

FIGS. 2-10 illustrate various screen displays of one exemplary implementation of the language input user interface 132. Symbol "P" is used throughout FIGS. 2-10 to represent phonetic text that has been input and displayed in the UI, but has not yet been converted into language text. Symbol "C" represents converted language text that has been converted from input phonetic text P. Subscripts are used with each of the phonetic text P, for example, $P_1, P_2, \ldots P_N$, and the converted language text C, for example, $C_1, C_2, \ldots C_N$, to represent individual ones of the phonetic and converted language text.

Integrated In-Line Text Input/Output

Figure 2:
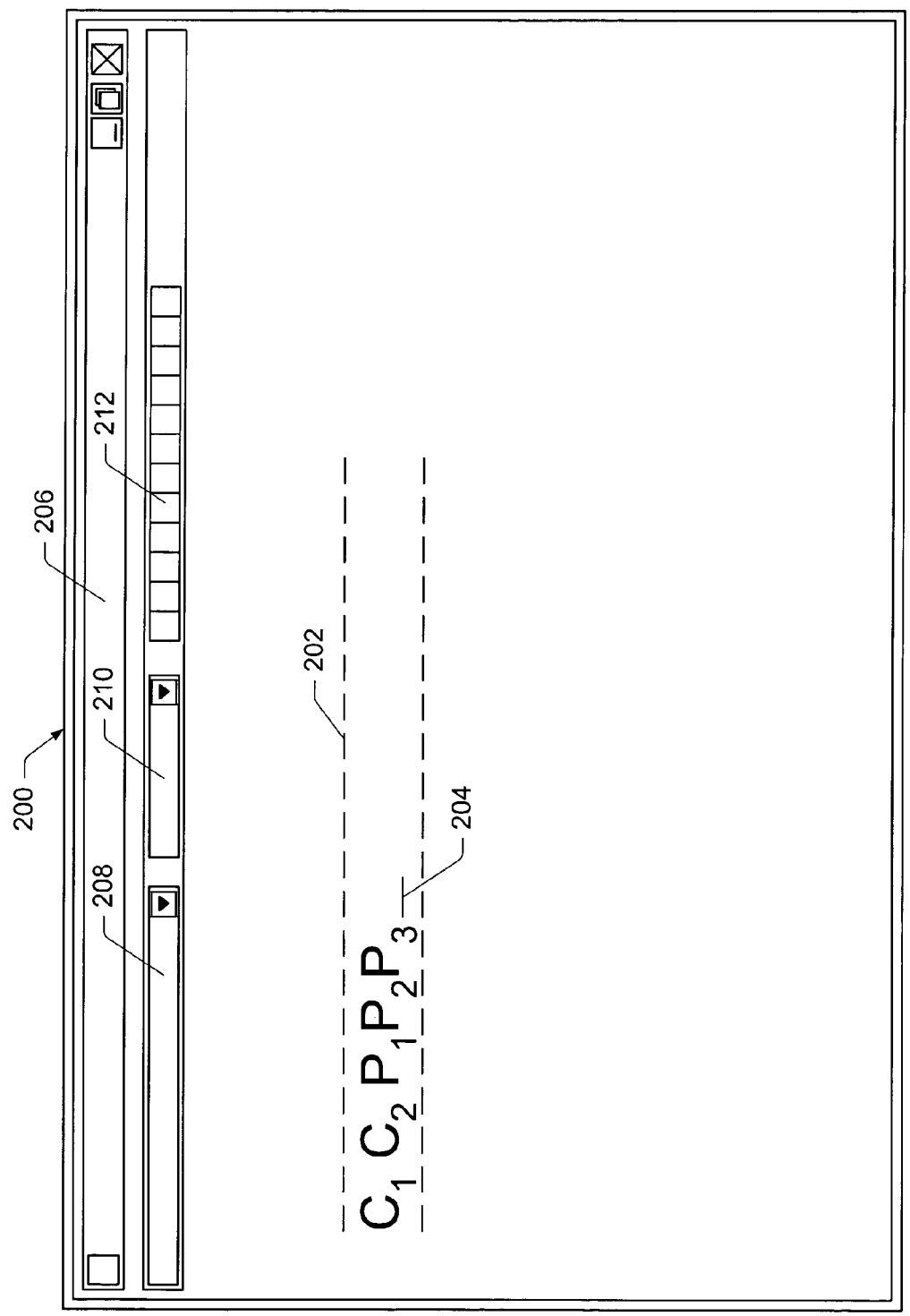
FIG. 2 is a diagrammatic illustration of a screen display of one implementation of a language input user interface.

FIG. 2 shows a screen display 200 presented by the language input UI 132 alone, or in conjunction with an operating system. In this illustration, the screen display 200 resembles a customary graphical window, such as those generated by Microsoft's Windows brand operating system. The graphical window is adapted for use in the context of language input, and presents an in-line input area 202 in which phonetic text is entered and subsequently converted to language text. The in-line area 202 is represented pictorially by the parallel dashed lines.

An input cursor 204 marks the present position where the next phonetic text input will occur. The graphical UI may further include a plurality of tool bars, such as tool bars 206, 208, 210, 212, or other functional features depending on the application, e.g., word processor, data processor, spread sheet, internet browser, email, operating system, etc. Tool bars are generally known in the word or data processing art and will not be described in detail.

The in-line input area 202 integrates input of phonetic text P and output of the converted language text C. This advantageously allows the user to focus attention on a single area of the screen. As the user enters phonetic text (via key entry or voice), the phonetic text P is presented in-line in a first direction (e.g., horizontal across the screen). The input cursor 204 is positioned by or in alignment with the converted language text $C_1C_2$ and the input phonetic text $P_1P_2P_3$. In FIG. 2, the input sequence is from left to right and the input cursor 204 is positioned at the right side of the previously input phonetic text $P_1P_2P_3$. It will be appreciated that it is within the scope of the present invention to input text in the same direction in which a given language is read, and that the "left to right" input sequence discussed in the present implementation is merely one example. Further, it will be appreciated that the language input UI is capable of in-line input in virtually any direction including, but not limited to, vertically, diagonally, etc. Other in-line formats are conceivable including various three dimensional formats wherein the in-line input feature might appear to the user to extend away or toward the user.

Automatic Conversion

As the user inputs phonetic text P, the converter 138 automatically converts the phonetic text to converted language text C. Typically, a few of the phonetic text elements P (e.g., one to six phonetic text elements P) is entered before the phonetic text P is converted to language text C.

As conversion is made, the converted language text C is presented in the same line as the phonetic text P, as indicated by the in-line area 202. As the user continues to enter phonetic text, the most recently input phonetic text P is displayed in-line with the previously converted language text C. In FIG. 2, for example, phonetic text $P_1P_2P_3$ is displayed in-line with the most recently converted language text $C_1C_2$. Displaying input phonetic text P in the same line with previously converted language text C allows users to focus their eyes in the same line, thereby making the input process more intuitive and natural, as well as allowing faster input.

Figure 3:
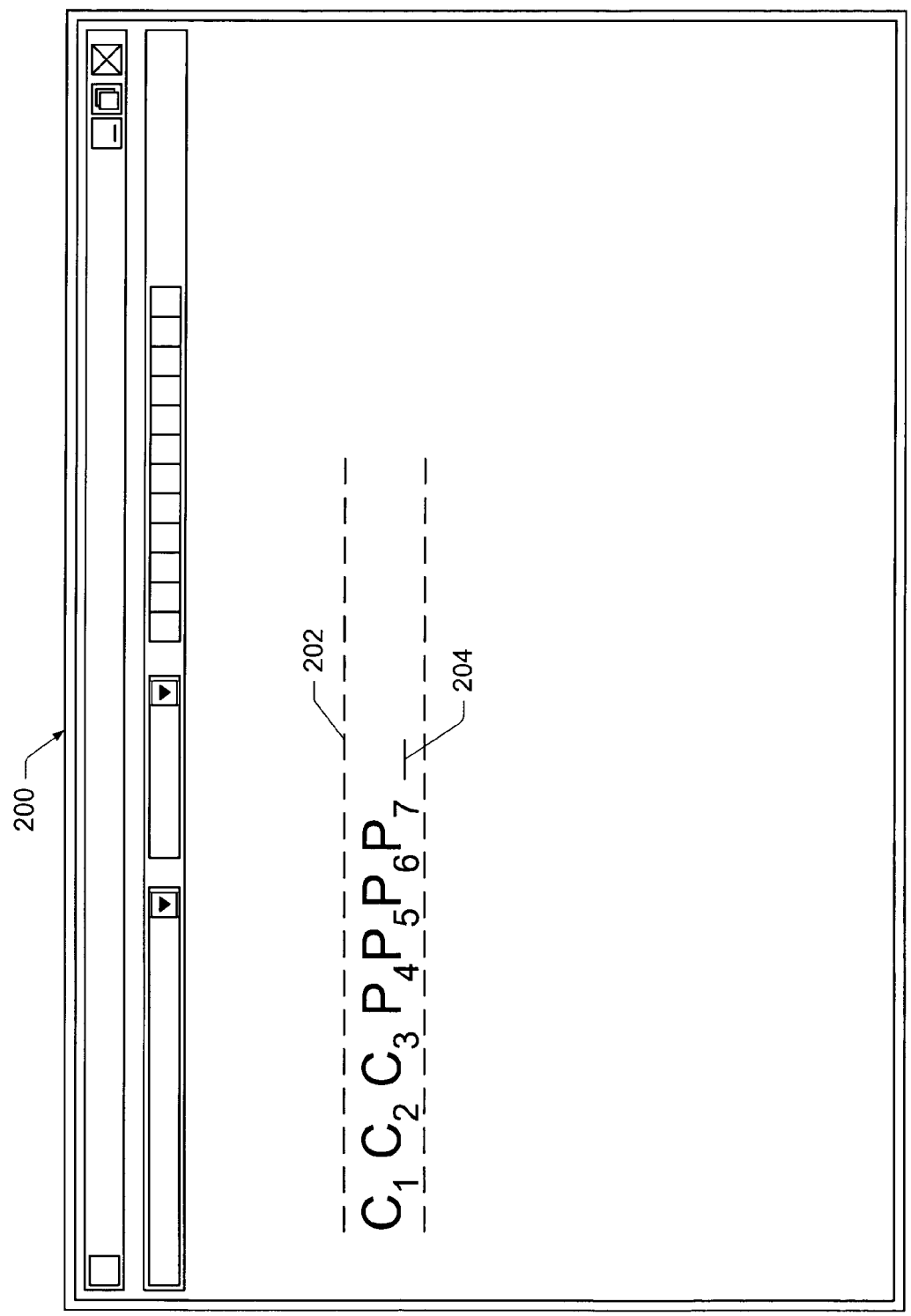
FIG. 3 is a diagrammatic illustration of a screen display of the language input UI, which shows an automatic conversion feature.

As the user continues to enter phonetic text P, the user interface automatically converts the phonetic text P in real time to language text C without the user having to switch modes. As shown in the example of FIG. 3, as soon as the user enters phonetic text $P_4$, the previous phonetic text $P_1P_2P_3$ is automatically converted to language text $C_3$. The user continues inputting phonetic text $P_4P_5P_6P_7$ without having to switch modes or hesitating.

Conversion from phonetic text to language text is an automatic process controlled by the language model 136. The language text $C_3$ is selected as having the highest probability among all possible language text and so is used in the automatic conversion. However, the more a user types, the greater the context considered. Accordingly, language text $C_3$ might be changed to different language text upon further entry of phonetic text such as $P_4P_5P_6P_7$.

The language input architecture 131 may be configured to minimize how often the converted language text is changed in response to entry of additional input text. In some contexts, it is possible that the converted language text could change with each entered character of input text, essentially flipping among two or more possible interpretations that have approximately equal likelihood of being intended by the user in the given context. The constant flipping of language text might become visually distracting to the user.

To minimize textual flipping, the converter 138 may implement one or more probabilistic-based rules that stipulate maintaining the current language text unless there is a significant likelihood that another context is intended. In this way, the converter 138 is reluctant to change the converted language text to a second language text when the second language text is only slightly better from a statistical standpoint. The degree of significance varies with the context. As an example, the converter 138 may be configured to modify the language text only when the modified language text is at least five percentage points more likely than the language text it is replacing.

Sentence-Based and Confirmed Automatic Conversion

Users may not feel comfortable if a very long string of text (e.g., a paragraph of text) is subject to conversion. In one implementation of the user interface, the automatic conversion from phonetic text P to language text C is a sentence-based automatic conversion. In other words, once a sentence is complete, the language text C in that sentence will not be further converted automatically to different language text C when inputting phonetic text P in a subsequent sentence. The sentence-based automatic conversion feature significantly reduces users' typing errors as well as preventing a previous sentence from being continuously converted automatically.

It is appreciated that a sentence can be defined in many other ways. For example, a sentence can be defined as a string of text within certain predefined punctuation, such as a string of text between two periods, a string of text between various predefined punctuation, a string of text containing certain text elements, and so forth. Once a user enters punctuation, the string of text entered between the punctuation and a previous punctuation, if any, may be treated as a sentence. The string of converted language text C in that sentence is not further automatically converted as the user inputs phonetic text in subsequent sentences. A person skilled in the art will appreciate that the automatic conversion can be based on two or more sentences if desired.

Figure 4:
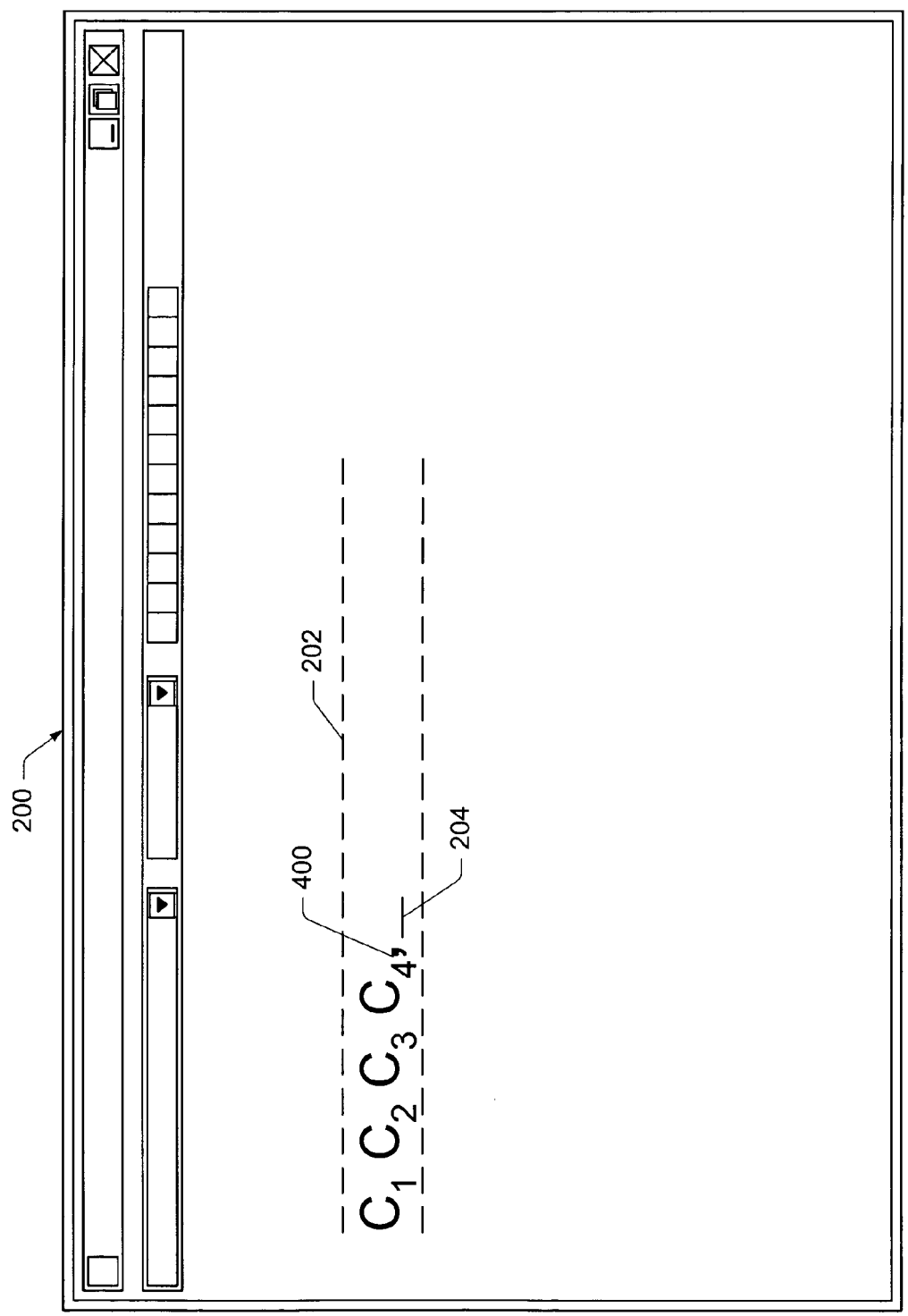
FIG. 4 is a diagrammatic illustration of a screen display of the language input UI, which shows a sentence-based automatic conversion feature.

FIG. 4 illustrates the screen display 200 at a point in which a sentence is confirmed by way of punctuation. Entry of punctuation, in addition to confirming a sentence, will typically result in the phonetic text P at the end of the sentence being automatically converted to language text C. For example as shown in FIG. 4, once a comma 400 is entered, phonetic text $P_4P_5P_6P_7$ is converted to language text $C_4$. The string of language text $C_1C_2C_3C_4$ is now treated as a sentence. Converted language text $C_1C_2C_3C_4$ will no longer be automatically further converted.

In addition to sentence-based automatic conversion, a user can expressly confirm one or more of the converted language text C following its conversion from entered phonetic text P. A user can confirm the just converted language text C by entry of a user command at the keyboard (e.g., a space bar entry) so that the just converted language text C will not be further automatically converted in view of the context of the sentence. A detailed example of this feature is discussed later with reference to FIGS. 20 and 24.

Deferred Conversion

In many languages, users are typically more accustomed to reading and correcting language text than phonetic text. As phonetic text is entered, the user commonly waits for conversion before attempting to discern whether the entered text is accurate. This is particularly true for the Chinese user, who prefers reading and correcting Chinese Hanzi characters as opposed to Pinyin characters.

In view of this user characteristic, the language input architecture 131 is designed to contemplate when to convert the phonetic text to the language text. Generally, conversion is made when the converter is sufficiently confident that the converted language text was intended by the user. Characterized in the UI context, the issue becomes how many characters of the phonetic text should be displayed at any one time such that eventual conversion results in highly likely language text that is unlikely to be modified as the user enters in more phonetic text. Converting too soon results in more errors in the converted language text, thereby forcing the user to correct the converted language text more often. Converting too late creates a distraction in that the user is presented with long strings of phonetic text rather than the desired language text.

As a compromise between converting too early and converting too late, the language input architecture may be configured to defer conversion until an optimum number of phonetic characters are entered to ensure a high conversion accuracy. In practice, the architecture is designed to defer selecting and displaying converted language text in place of the phonetic text until after entry of a minimum number of characters and before entry of a maximum number of characters. As one example, a language input architecture tailored for Chinese might be configured to convert Pinyin text to Hanzi text when at least one Pinyin character and at most six Pinyin characters have been entered and displayed in the UI.

According to one implementation, the language input architecture implements a set of rules to determine, for a given context, the optimum number of phonetic characters that may be entered prior to selecting and displaying the converted language text. The rules may be summarized as follows:

Rule 1: Always display the last (i.e., most recently entered) input character.

Rule 2: After entry and display of multiple input characters, evaluate top N conversion candidates for one or more characters in the candidates that may match. If at least one converted character is the same for all N conversion candidates, convert at least one input character forming part of the input text to the matching converted character(s) in the output text.

Rule 3: If the first most likely conversion candidate scores significantly higher than the second most likely conversion candidate, convert at least one input character to the character(s) of the first conversion candidate.

Modeless Editing

FIGS. 5-9 illustrate an exemplary implementation of the modeless editing features supported by the architecture. The user interface enables a user to seamlessly transition from input mode to edit mode without an explicit mode switch operation. Moreover, the edit mode supports traditional editing functions such as addition, deletion, and replacement of language text. The present invention allows replacement of language text by inputting new phonetic text or by selection of replacement language text from a list of at least one replacement language text candidate.

In-Place Error Correction

Figure 5:
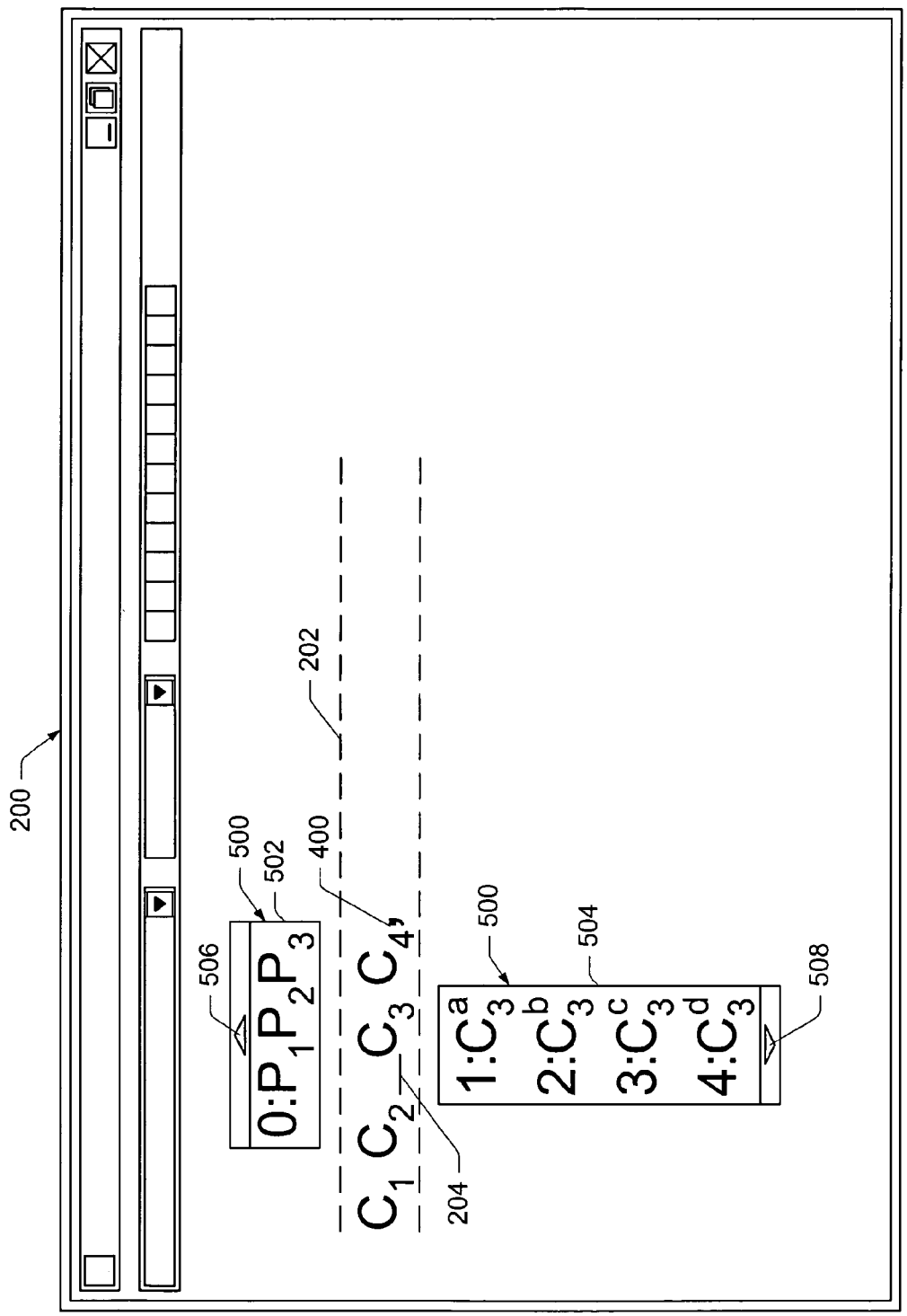
FIG. 5 is a diagrammatic illustration of a screen display of the language input UI, which shows an in-place error correction feature and a phonetic text hint feature.

FIG. 5 shows a screen display 200 with various edit features. For discussion purposes, assume that the user has confirmed the language text $C_1C_2C_3C_4$ (previously of FIG. 4) by entering punctuation 400 and now wishes to edit the confirmed language text $C_1C_2C_3C_4$. The user repositions the cursor 204 to a desired location within the confirmed language text $C_1C_2C_3C_4$. Cursor positioning can be accomplished in many different ways, including but not limited to, arrow keys, mouse click, or verbal command. FIG. 5 illustrates the cursor 204 repositioned in front of the language character $C_3$ to select this character for editing.

Once the cursor 204 is positioned to the front of the language character $C_3$, the user enters one or more user commands to invoke an edit window or box 500 that is superimposed on or about the in-line area 202 at the point in the text containing the character(s) to be edited. The user command can be accomplished in any of several manners that are well known in the art, including but not limited to, depressing an escape key "ESC" on keyboard 112.

In the illustrated implementation, the edit window or box 500 pops up adjacent to the language character $C_3$ in a second direction (e.g., vertical) orthogonal to the first direction (e.g., horizontal) of the in-line text. The pop-up edit window 500 has two parts: an input text hint window 502 and a scrollable candidate window 504. These parts are preferably invoked simultaneously by a common user command. The corresponding phonetic text $P_1P_2P_3$ for the character $C_3$, which was previously input by a user, appears in the input text hint window 502 directly above and in vertical alignment with the language character $C_3$ being edited. Displaying the input phonetic text $P_1P_2P_3$ allows a user to see what they had previously entered for the language text $C_3$ and to edit it if necessary. The input text hint window 502 has a scroll up bar 506 disposed at the top. Activation of this scroll up bar 506 causes the phonetic text $P_1P_2P_3$ to slide into the sentence and replace the language text character $C_3$.

The candidate window 504 contains a scrollable list of at least one replacement language text candidate $C_3^a$, $C_3^b$, $C_3^c$, $C_3^d$, having the same or similar phonetic text as the language text $C_3$. The candidate window 504 is arranged orthogonal to the in-line input area 202 containing the language text $C_1C_2C_3C_4$ and directly below and in vertical alignment with the language character $C_3$. A superscript is used to represent different language text characters, such as $C_3^a$, $C_3^b$, $C_3^c$, and $C_3^d$. When there are more candidates than can be displayed in candidate window 504, a scroll down bar 508 is presented at the bottom of candidate window 504. A user can select (e.g., click on) the scroll down bar 508 to view additional replacement language text. One feature of the in-place windows 502 and 504 is that the scrolling operation can be animated to demonstrate the candidates or text moving up or down. This gives the user visual feedback that the list is being scrolled one item at a time.

The phonetic text $P_1P_2P_3$ in the input text hint window 502 and the replacement language text candidates $C_3^a$, $C_3^b$, $C_3^c$, $C_3^d$ in the candidate window 504 are additionally referenced by numbers 0, 1, 2, 3, 4, as shown. The numbering method of the replacement language text and the size of the candidate window 504 can be implemented in different ways. In one implementation, the candidate window 504 has a limited size and lists only the top four highest probabilities of replacement language text.

The language text candidates $C_3^a$, $C_3^b$, $C_3^c$, $C_3^d$ in the candidate window 504 are preferably arranged in some order or ranking. For instance, an order may be based on a probability or likelihood that the candidate is actually the one intended by the user originally. This probability is computed by the search engine 134, in conjunction with candidates returned by the language model 136. If the probability of one replacement language text in a given context is higher than the probability of another replacement language text in the given context, the replacement language text with the higher probability is displayed closer to the language text to be edited and with a lower reference number.

A user can optionally select the phonetic text $P_1P_2P_3$ or select one of the replacement language text $C_3^a$, $C_3^b$, $C_3^c$, $C_3^d$ by entering the appropriate reference number to replace the character text $C_3$ or through other common techniques (point and click on the selected option). The selected replacement is then substituted for the character $C_3$ in the in-line text. Once the user elects a candidate, the pop-up edit window 500 can be configured to automatically disappear, leaving the corrected text. Alternatively, the user may explicitly close the text hint window 502 and the candidate window 504 using conventional methods, such as a mouse click outside the windows 502 and 504.

The text replacement feature implemented by in-place windows 502 and 504 is referred to as the in-place error correction feature. The selected phonetic text $P_1P_2P_3$ or the selected one of the replacement language text $C_3^a$, $C_3^b$, $C_3^c$, $C_3^d$ is displayed in-place of the language text $C_3$ that is to be replaced. The in-place error correction feature allows a user to focus generally proximate a string of language text containing the language text to be edited.

Second Candidate List

Figure 6:
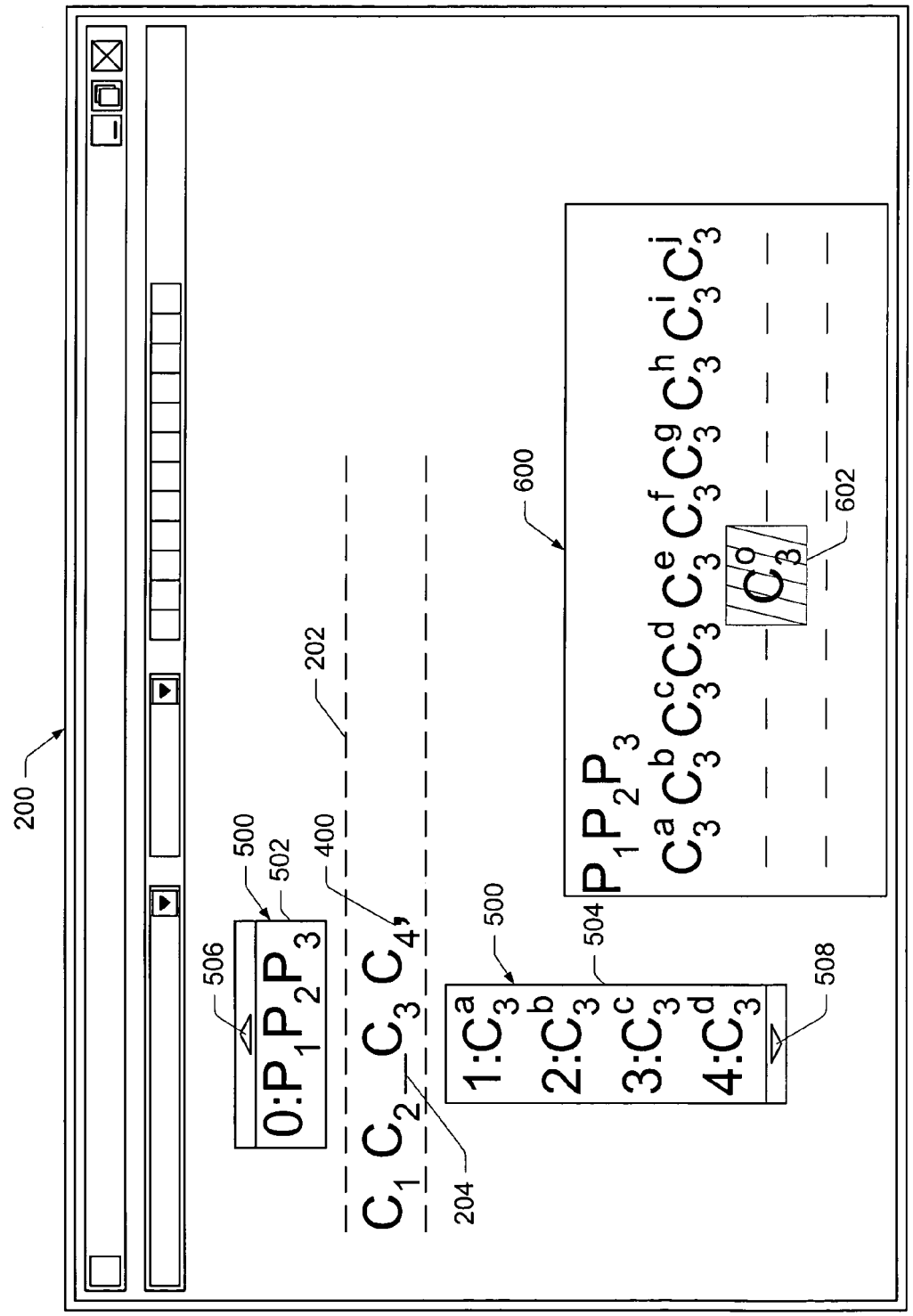
FIG. 6 is a diagrammatic illustration of a screen display of the language input UI, which shows a second candidate list feature.

FIG. 6 illustrates a screen display 200 similar to that shown in FIG. 5, but also showing a second candidate window 600 separate from and adjacent to the first candidate window 504. The second candidate window 600 lists a larger or perhaps complete list of replacement language text that has the same or similar phonetic text as the corresponding phonetic text $P_1P_2P_3$ of the character text $C_3$ to be edited. The phonetic text $P_1P_2P_3$ in the input text hint window 502 and the replacement language text $C_3^a$, $C_3^b$, $C_3^c$, $C_3^d$ in the candidate window 504 are also listed in the second candidate window 600. In an alternative embodiment, only the additional replacement candidates are listed in the second candidate window 600.

To open the second candidate window 600, a user enters a command, such as a depressing a right arrow key on the keyboard while active in the candidate window 504. The user can then select a desired replacement language text by a suitable command, such as a mouse click or a key entry. A user may move a focus 602 from text character to text character.

The candidates in second candidate window 600 may also be arranged in some order, although not necessarily according to the same ranking technique used for the first candidate window 504. Typically sorting by probability score, as is done with the candidates in the first candidate window 504, may not be as useful for the full candidate window 600 because the variations between many candidates is small and somewhat meaningless. The user may have no intuitive feel for locating a particular candidate in this setting. Accordingly, the second candidate window 600 attempts to rank the candidates in some other way that allows intuitive discovery of the desired candidate.

One metric that may be used to rank the candidates in the second candidate window 600, particularly in the context of the Japanese and Chinese languages, is a measure the complexity of a character or symbol. For a list of Chinese text candidates, for instance, the candidates may be listed according to the number of strokes required to form the candidate. A stroke order imposes some tangible feel for a user who is hunting for a desired language text. The user can quickly glance to a particular area of the window 600 that holds characters of seemingly similar complexity. This ranking metric is not intended to cause the user to count or know a precise number of strokes, but only to give a strong and consistent and visually recognizable sorting order.

To close the window 600, a user enters a command such as a key entry at the keyboard or a mouse click outside the window 600. It is appreciated that the control of opening/closing of windows, scrolling up/down and left/right in windows, and scrolling up/down in windows are known in the art and are not is described in detail.

In-Place Phonetic Text Correction

Figure 7:
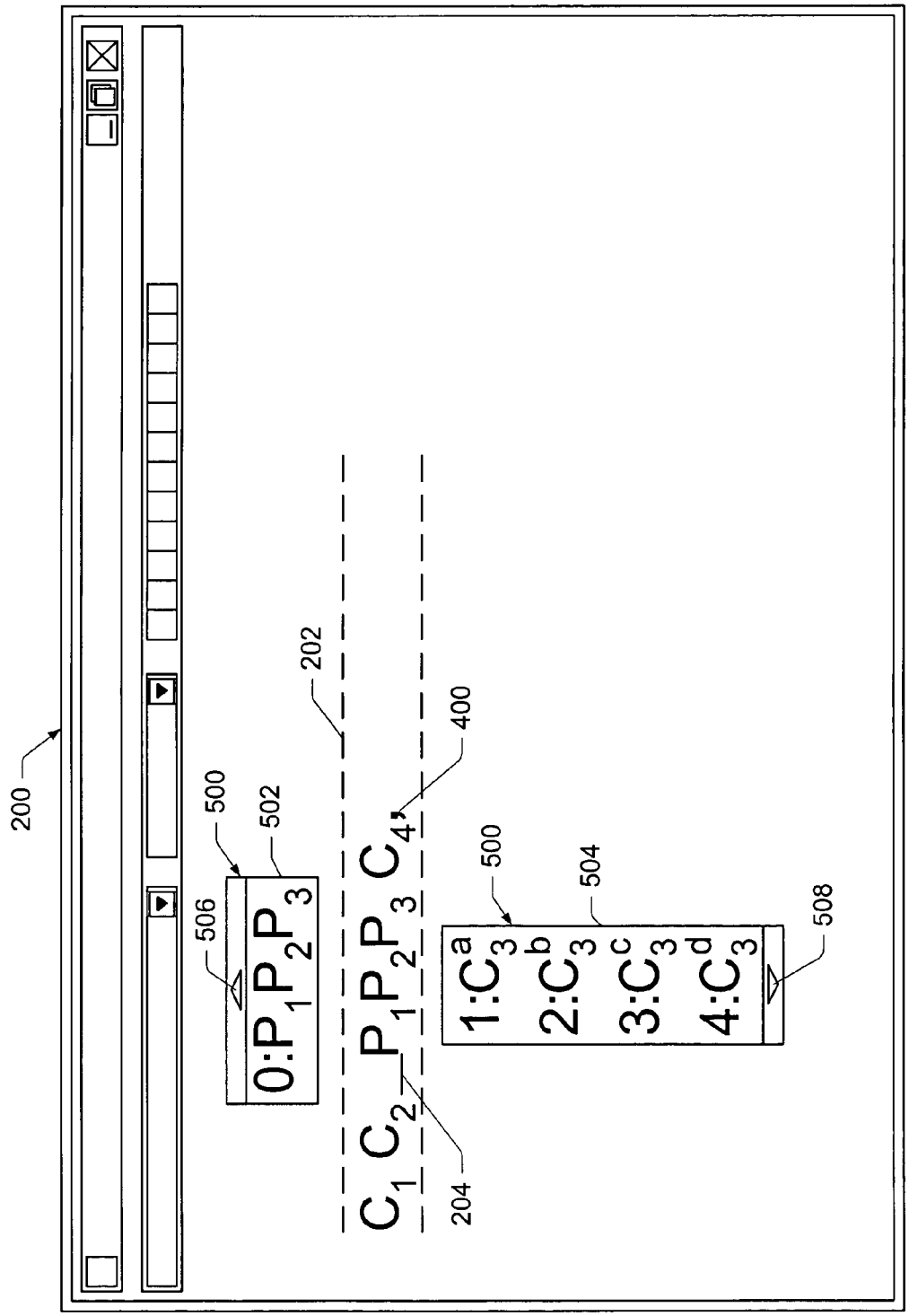
FIG. 7 is a diagrammatic illustration of a screen display of the language input UI, which shows an in-place phonetic text correction feature.
Figure 8:
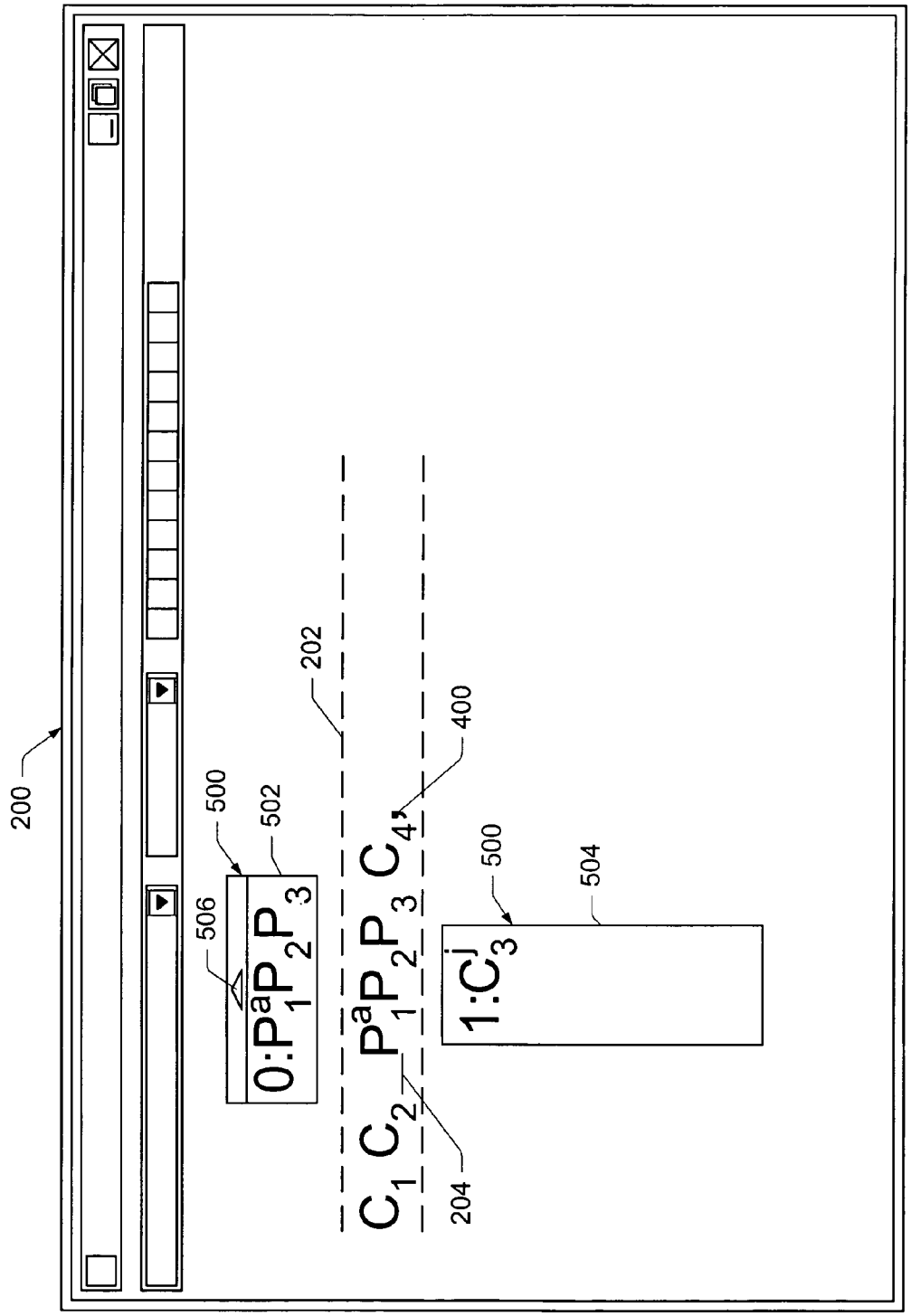
FIG. 8 is a diagrammatic illustration of a screen display of the language UI, which shows a subsequent screen of the in-place phonetic text correction of FIG. 7.
Figure 9:
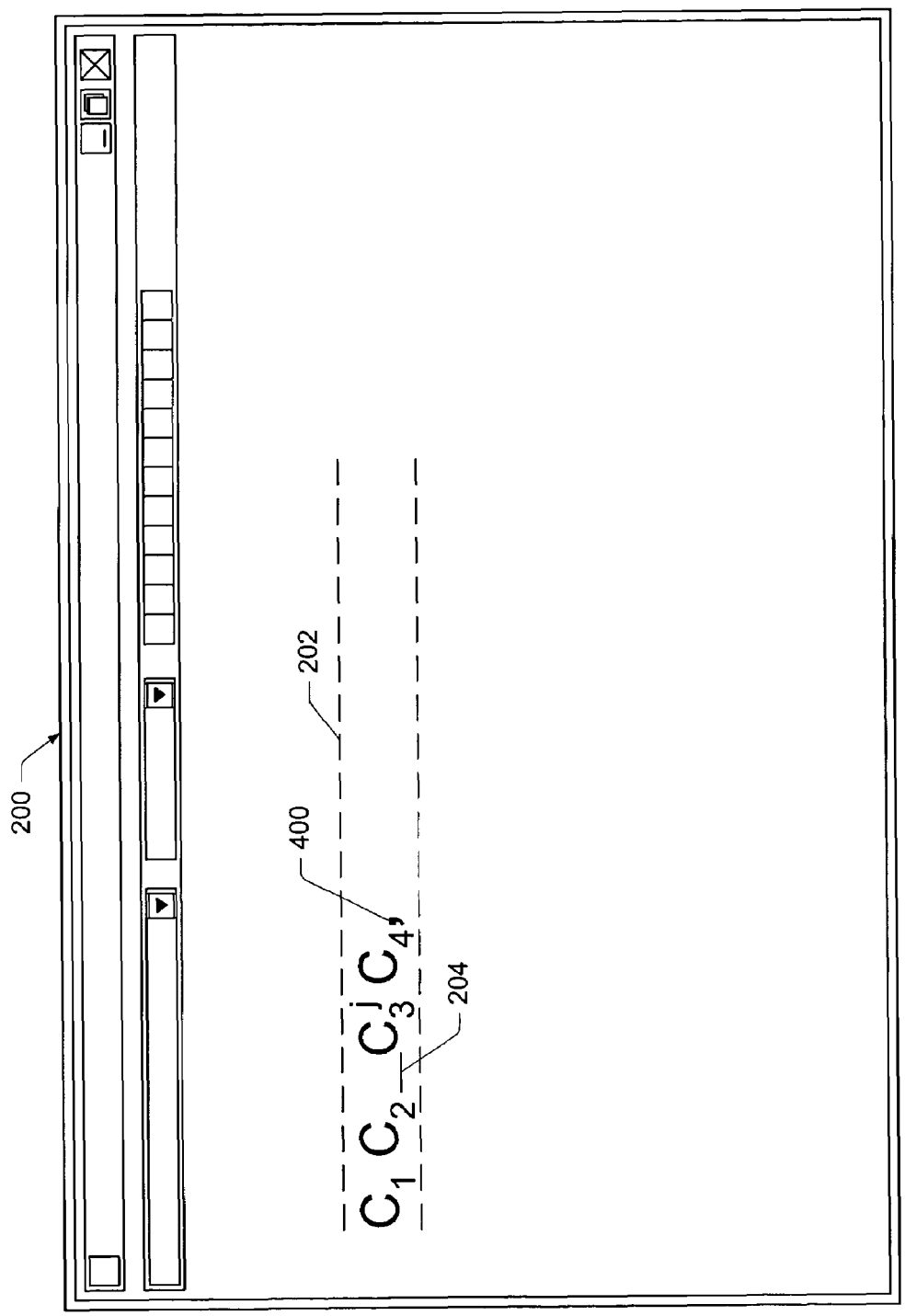
FIG. 9 is a diagrammatic illustration of a screen display of the language UI, which shows a subsequent screen of the in-place phonetic text correction of FIGS. 7 and 8.

FIGS. 7-9 show a sequence of screen displays 200 at various instances to illustrate an in-place phonetic text correction of the phonetic text $P_1P_2P_3$ shown in FIG. 5. In this example, a user determines that the phonetic text $P_1P_2P_3$ in the input text hint window 502 is incorrect. The correct phonetic text should be $P_1{}^aP_2P_3$. To correct the phonetic text, the user first selects the phonetic text $P_1P_2P_3$ from the input text hint window 502.

FIG. 7 shows that the selected phonetic text $P_1P_2P_3$ is displayed in place of the text character $C_3$ being edited. The user can then edit the phonetic text by changing $P_1$ to $P_1{}^a$.

FIG. 8 shows the UI after the phonetic text is changed to $P_1{}^a$. The text hint window 502 is also updated to reflect the change. As a result of the edit operation, at least one new replacement language text $C_3{}^j$ having the same or similar edited phonetic text $P_1{}^aP_2P_3$ is displayed in the candidate window 504. The user can then select the replacement language text (e.g. $C_3{}^j$) in the candidate window 504.

FIG. 9 shows the selected replacement text $C_3{}^j$ substituted for the edited phonetic text $P_1{}^aP_2P_3$. In an alternative embodiment, the edited phonetic text can be automatically converted to the most probable new replacement language text.

Mixed Language Entry

The language input architecture may be further configured to distinguish between two or more languages. The first language is detected as phonetic text and converted to language text, whereas the second language is detected as non-phonetic text and kept as is. The UI 132 presents the two languages concurrently in the same line as the user enters text. The technique advantageously eliminates the need to switch between two input modes when inputting multi-language text. As far as a user is concerned, the user interface is modeless.

Figure 10:
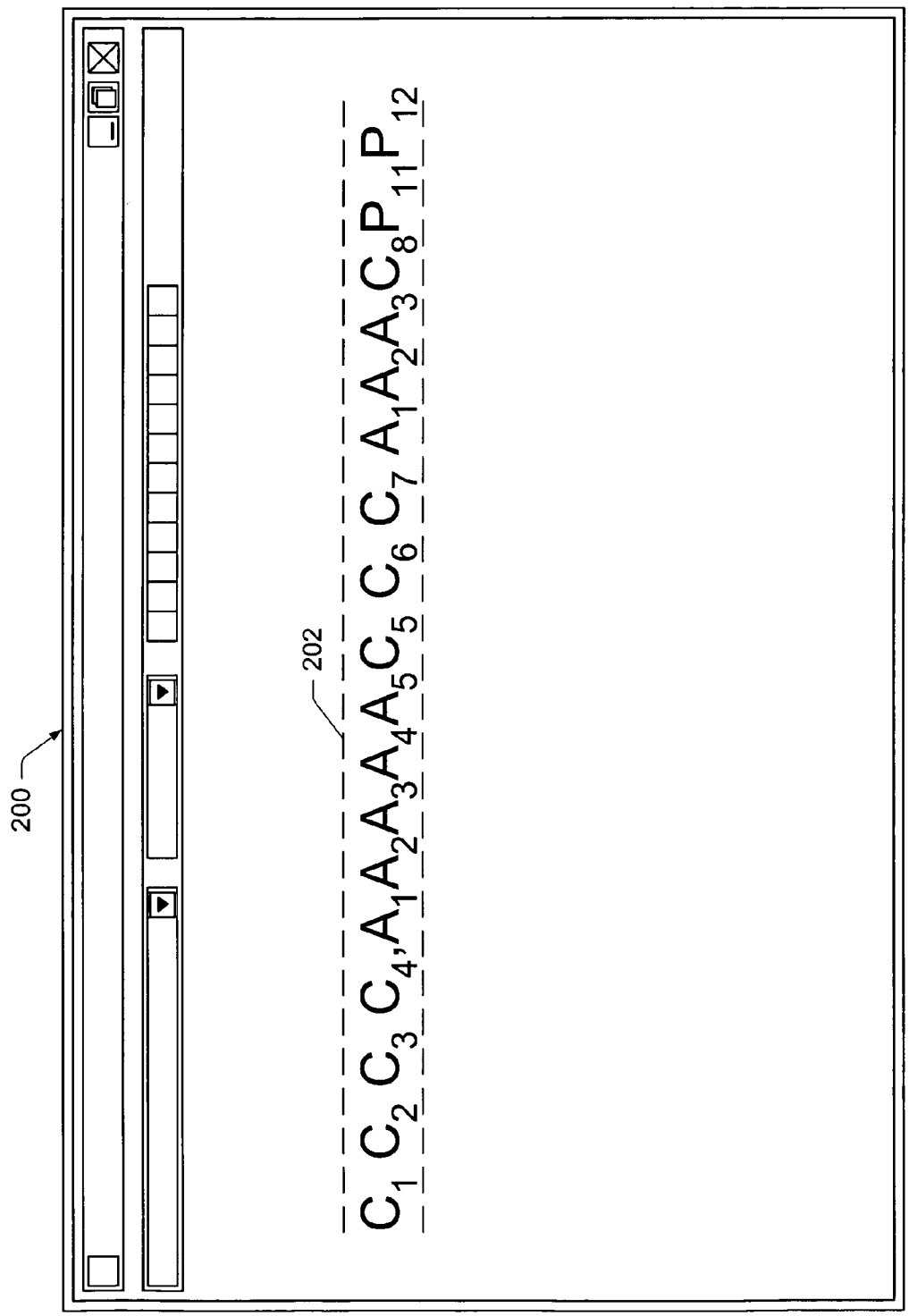
FIG. 10 is a diagrammatic illustration of a screen display of the language UI, which shows entry of mixed text containing multiple different languages.

FIG. 10 illustrates the screen display 200 of the user interface and demonstrates an integrated handling and presentation of mixed text of two different languages. Symbol "A" represents characters of a second language text. Second language A is a non-phonetic language wherein the second language text A is displayed as input by the user. As an example, the first language is Chinese Hanzi and the second language is English. It will be appreciated that the multiple languages might be any number of different languages.

In one implementation, a user might input mixed language text, one of which is phonetic text P (e.g., Pinyin) convertible to language text C (e.g., Hanzi). The phonetic text P of the character-based language is displayed in-line with the language text A until the phonetic text P is automatically converted to language text C, which is displayed in-line with the language text A of the second language. FIG. 10 illustrates the input phonetic text P, the converted language text C, and the second language text A within the same in-line area 202.

Different fonts or colors may be used to distinguish between the phonetic text P and the non-phonetic text A. As an example, the phonetic text P is displayed in a first font or color, while the non-phonetic text A is displayed in a second font or color that is different from the first font or color. In addition to fonts and colors, other techniques may be used to visually differentiate between the phonetic text P and the non-phonetic text A.

General UI Operation

Figure 11:
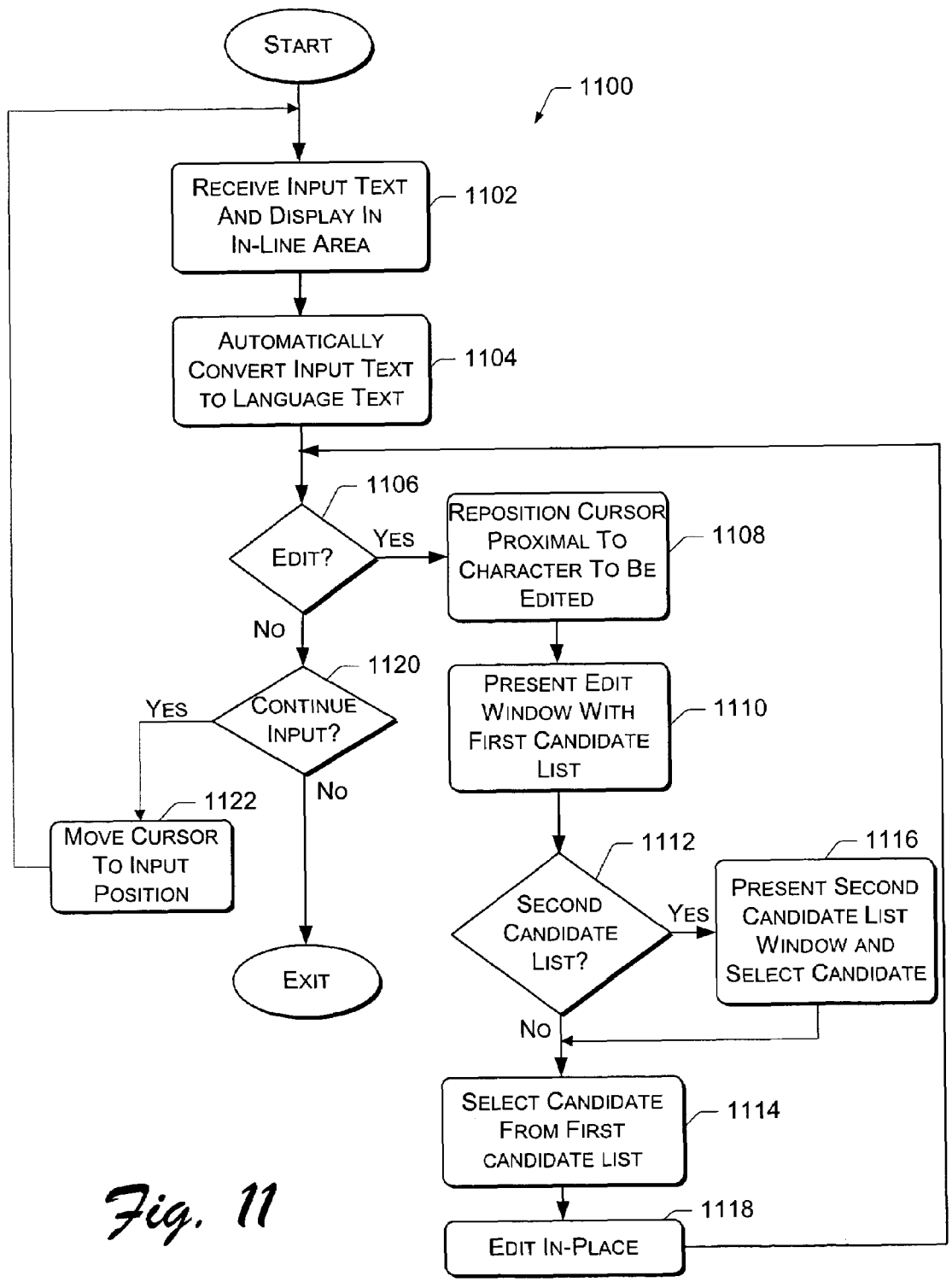
FIG. 11 is a flow diagram of a method for inputting text using a language input user interface.

FIGS. 11-19 illustrate methods implemented by the language input architecture. The methods are implemented as part of the language input user interface to facilitate convenient entry and edition of phonetic text, as well as edition of converted language text. FIG. 11 illustrates the general process, while FIGS. 12-19 illustrate certain of the operations in more detail. The methods are described with additional reference to the screen displays of FIGS. 2-10.

FIG. 11 shows a method 1100 for inputting text via the language input user interface. At operation 1102, the user interface enables a user to input text within the common in-line area 202. In the described implementation, the input text is a phonetic text, such as Chinese Pinyin. The input text is automatically converted to language text of a character-based language, such as Chinese Hanzi (operation 1104). One exemplary implementation of this conversion is described above with reference to FIG. 1. If the reader is interested, a more detailed discussion can be found in the incorporated co-pending application Ser. No. 09/606,660, entitled "Language Input Architecture For Converting One Text Form to Another Text Form With Tolerance To Spelling, Typographical, And Conversion Errors" and Ser. No. 09/606,807, entitled "Language Input Architecture For Converting One Text Form to Another Text Form With Modeless Entry."

Operation 1106 determines whether a user desires to edit the language text following conversion, as indicated by repositioning the cursor or an express command. If so (i.e., the "Yes" path from operation 1106), the UI receives the user's repositioning of the cursor proximal to the character to be edited (operation 1108). As illustrated in FIG. 5, the cursor may be repositioned in front of the language text character.

At operation 1110, the UI opens the edit window 500 in response to a user command as shown in FIG. 5. The edit window 500 includes the first candidate list 504 for replacing the language text. If a suitable replacement candidate is not presented in candidate list 504, the user may decide to invoke the second candidate list window 600, as illustrated in FIG. 6.

Operation 1112 determines whether the user has requested the second candidate window 600. If a suitable candidate is available on the first candidate list 504, and thus the user decides not to open the second candidate list window (i.e., the "no" branch from operation 1112), the user may select replacement language text from the first candidate list window to replace the language text to be edited (operation 1114).

On the other hand, if the user invokes the second candidate window (i.e., the "yes" branch from operation 1112), the UI opens the second candidate list window and allows the user to select replacement language text to replace the language text being (operation 1116). The selected replacement language text from either the first candidate list window 504 or the second candidate list window 600 is then displayed in place of the language text in the in-line area 202 (operation 1118). The operational flow continues in operation 1106.

If a user does not desire to edit text (i.e. the "no" path from operation 1106), the UI determines whether the user continues to input text, as indicated by the user repositioning the cursor and continuing to enter characters (operation 1120). If the user's actions tend to suggest a continuation of text entry, the cursor is moved back to the input position at the end of the current section (operation 1122) and operational flow continues in input in-line operation 1102. If the user does not wish to continue, the process ends.

In-Line Input: Operations 1102 and 1104

Figure 12:
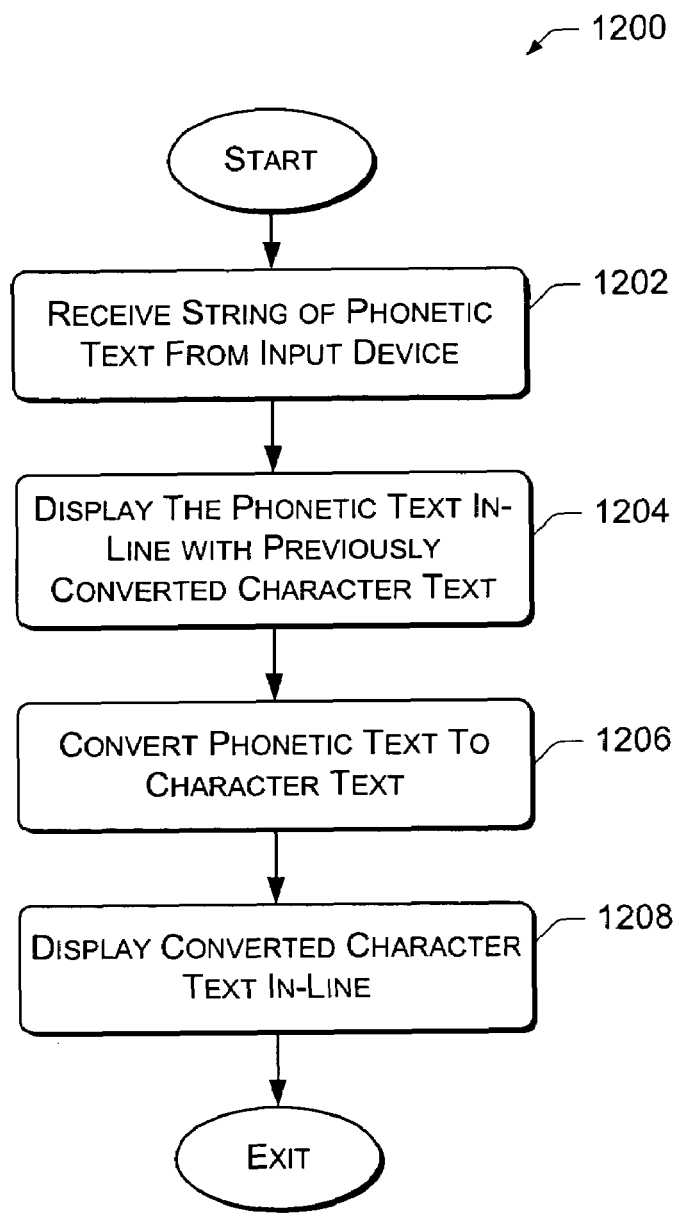
FIG. 12 is a flow diagram of an in-line input sub-process.

FIG. 12 illustrates an in-line input sub-process 1200, which is an exemplary implementation of operations 1102 and 1104 of FIG. 11. Exemplary screen displays depicting this sub-process are illustrated in FIGS. 2 and 3.

At operation 1202, the UI receives an input string of phonetic text (e.g., Pinyin) from an input device (e.g., keyboard, voice recognition). The language input UI displays the phonetic text within the same in-line area 202 as the previously converted language text (operation 1204). The phonetic text-to-language text converter 138 converts the string of phonetic text into language text (e.g., Hanzi) in operation 1206. The language input UI replaces the phonetic text string with the converted language text string and displays the language text in the in-line area 202 (operation 1208). Sub-process 1200 then exits.

Sentence-Based Conversion: Operation 1104

Figure 13:
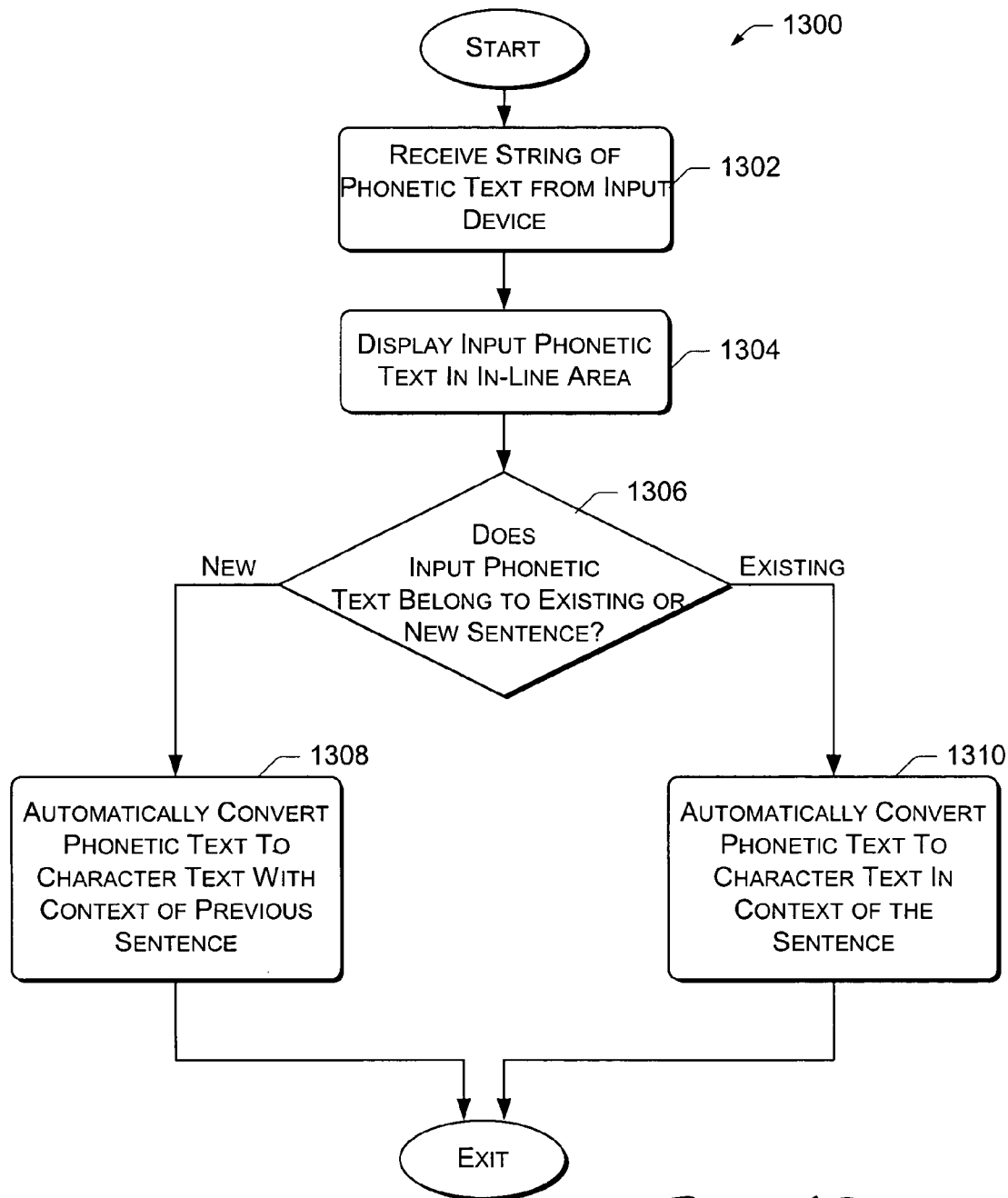
FIG. 13 is a flow diagram of an automatic conversion sub-process.

FIG. 13 illustrates an automatic conversion sub-process 1300, which is another exemplary implementation of operation 1104. Exemplary screen displays depicting this sub-process are illustrated in FIGS. 3 and 4.

At operation 1302, the language input architecture receives a string of phonetic text input by the user via an input device. The language input UI displays the input phonetic text in the in-line area 202 (operation 1304). At operation 1306, the language input architecture determines whether the phonetic text belongs in the existing sentence or a new sentence. This determination can be based on whether the user has entered some form of punctuation, such as a period or comma.

If input phonetic text belongs to a new sentence (i.e. the "new" path from operation 1306), the input phonetic text is automatically converted to language text without considering the content of previous text in the previous sentence, if any (operation 1308). Conversely, if the input phonetic text does not belong to a new sentence (i.e. the "existing" path from operation 1306), the phonetic text in the sentence is automatically converted within the context of the sentence (operation 1310). As part of this conversion, previously converted language text may be further modified as additional text continues to change the intended meaning of the entire sentence. Operational flow exits following the conversion operations 1308 and 1310.

Confirmed Conversion: Operation 1104

Figure 14:
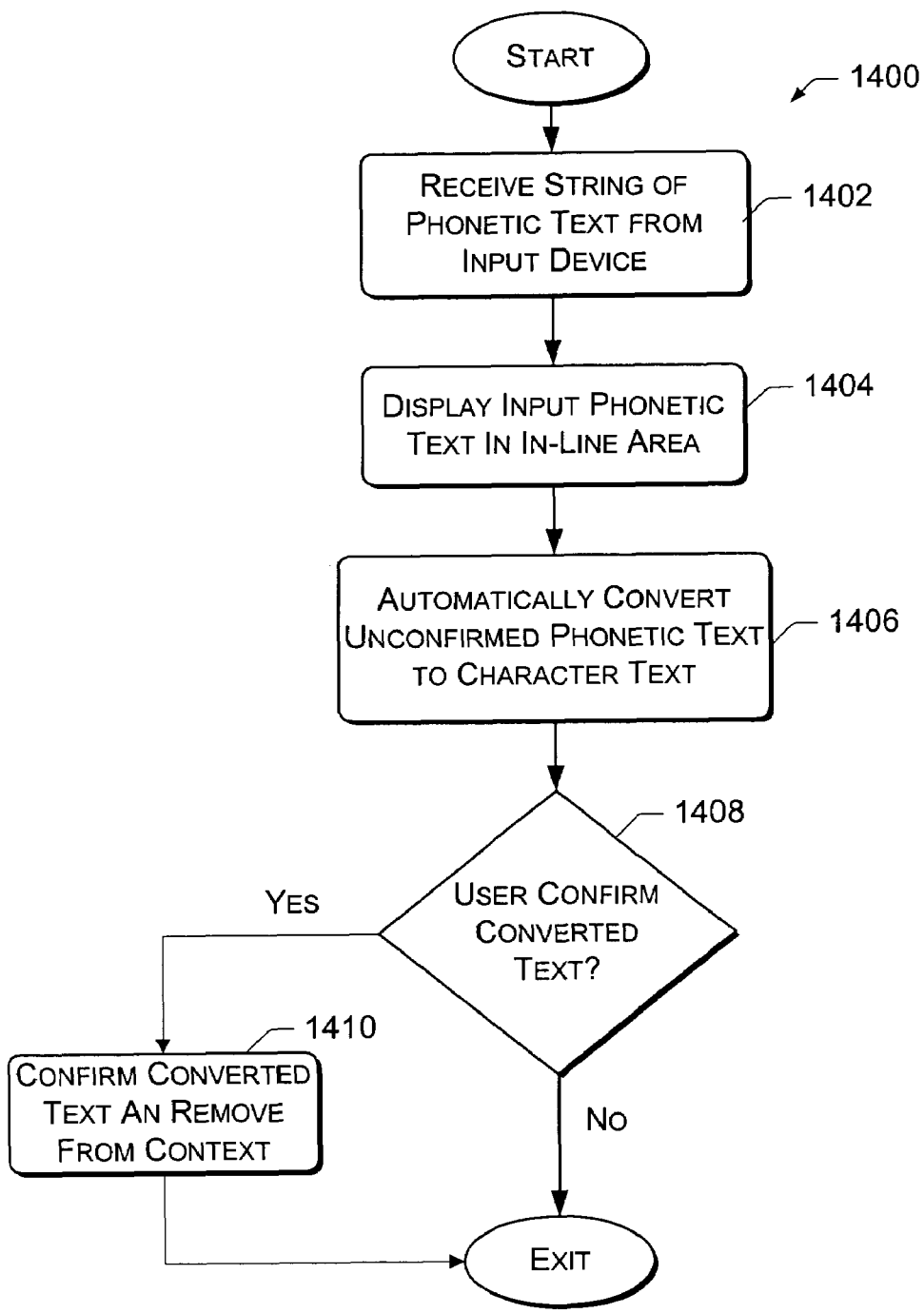
FIG. 14 is a flow diagram of an automatic conversion sub-process with confirmed character text.

FIG. 14 illustrates an automatic conversion sub-process 1400 in which the user confirms the converted language text. Sub-process 1400 is another exemplary implementation of operation 1104.

At operation 1402, the language input architecture receives a string of phonetic text input by the user via an input device. The language input UI displays the input phonetic text in the in-line area 202 (operation 1404). The phonetic text of the corresponding unconfirmed language text is automatically converted into language text of a character-based language (operation 1406).

At operation 1408, the language input UI determines whether the user has confirmed the converted language text. If not, the sub-process exits. Otherwise, if the user has confirmed the language text (i.e., the "yes" path from operation 1408), the UI confirms the converted language text and removes it from further contextual consideration as additional phonetic text is entered (operation 1410). Operational flow then exits.

In-Place Error Correction: Operations 1108-1118

Figure 15:
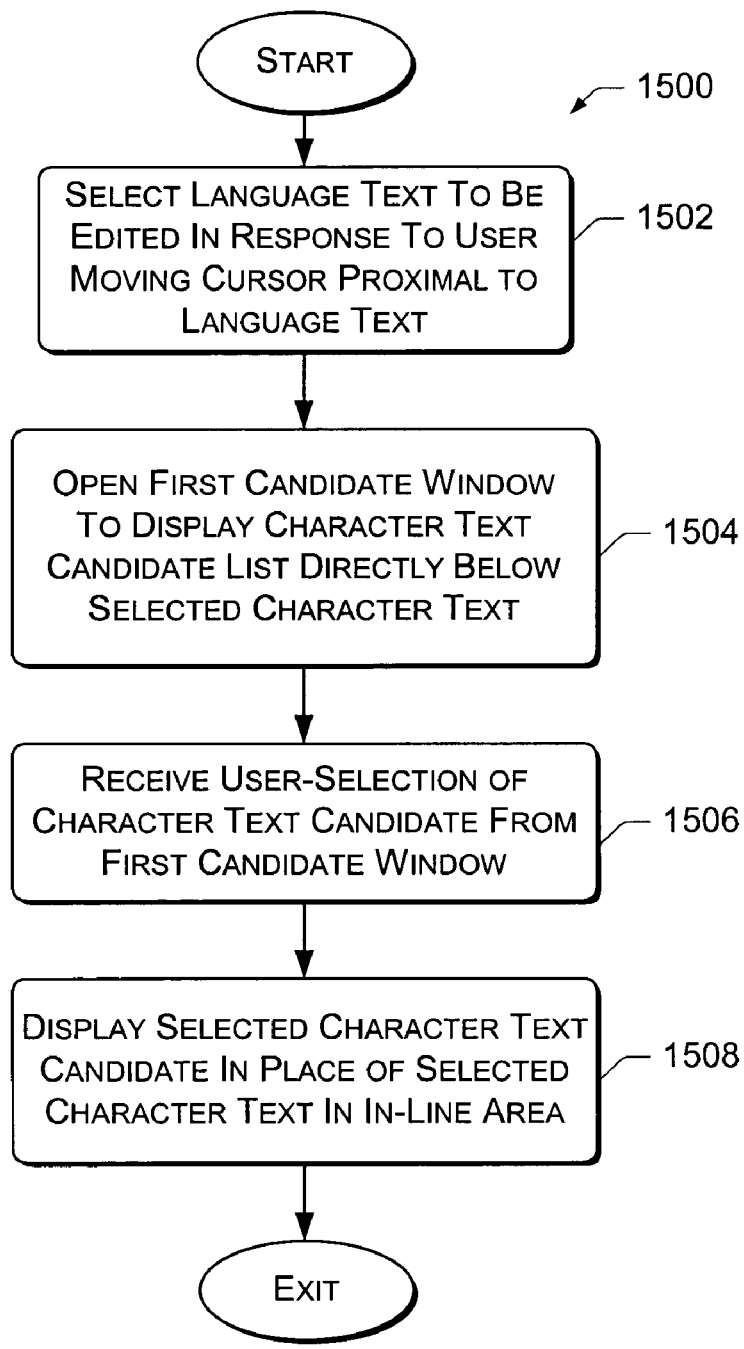
FIG. 15 is a flow diagram of an in-place error correction sub-process.
Figure 16:
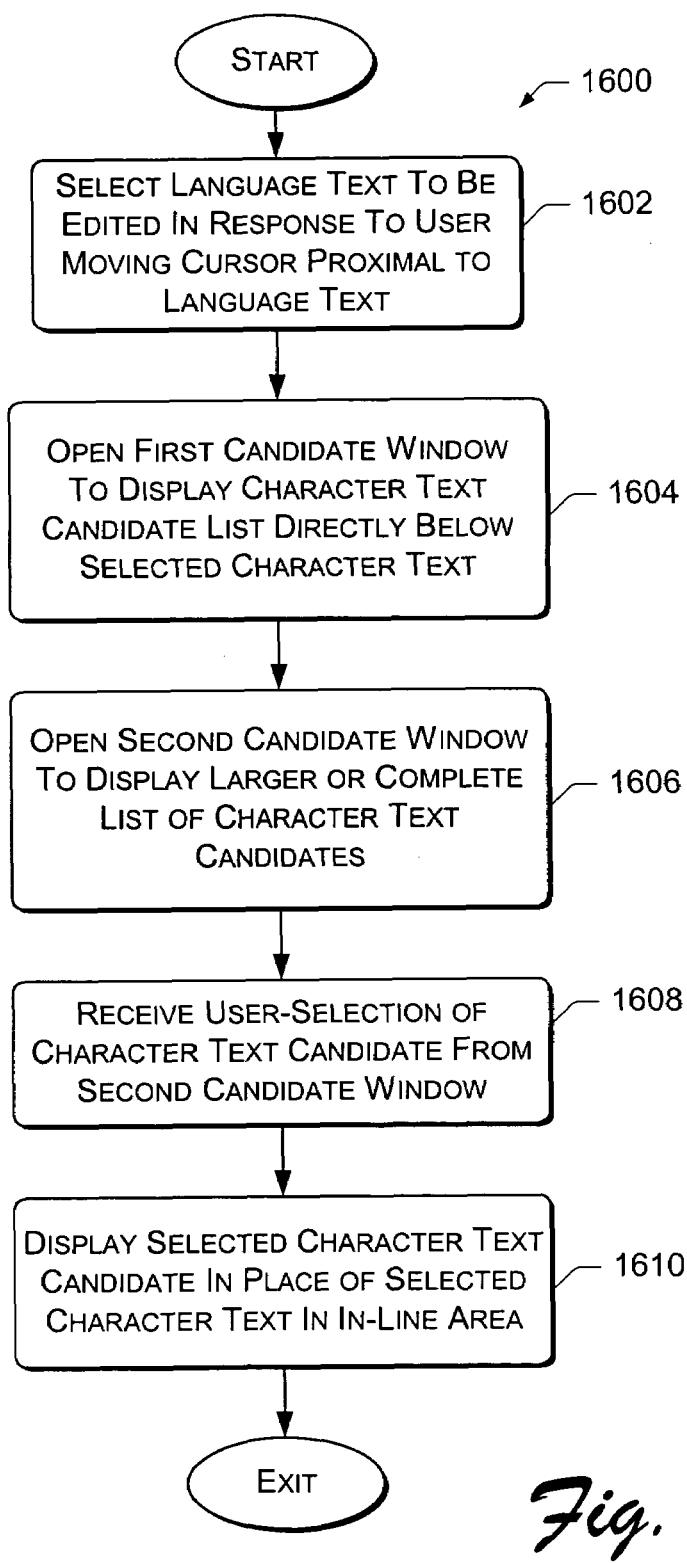
FIG. 16 is a flow diagram of an in-place error correction sub-process with a second candidate list.
Figure 17:
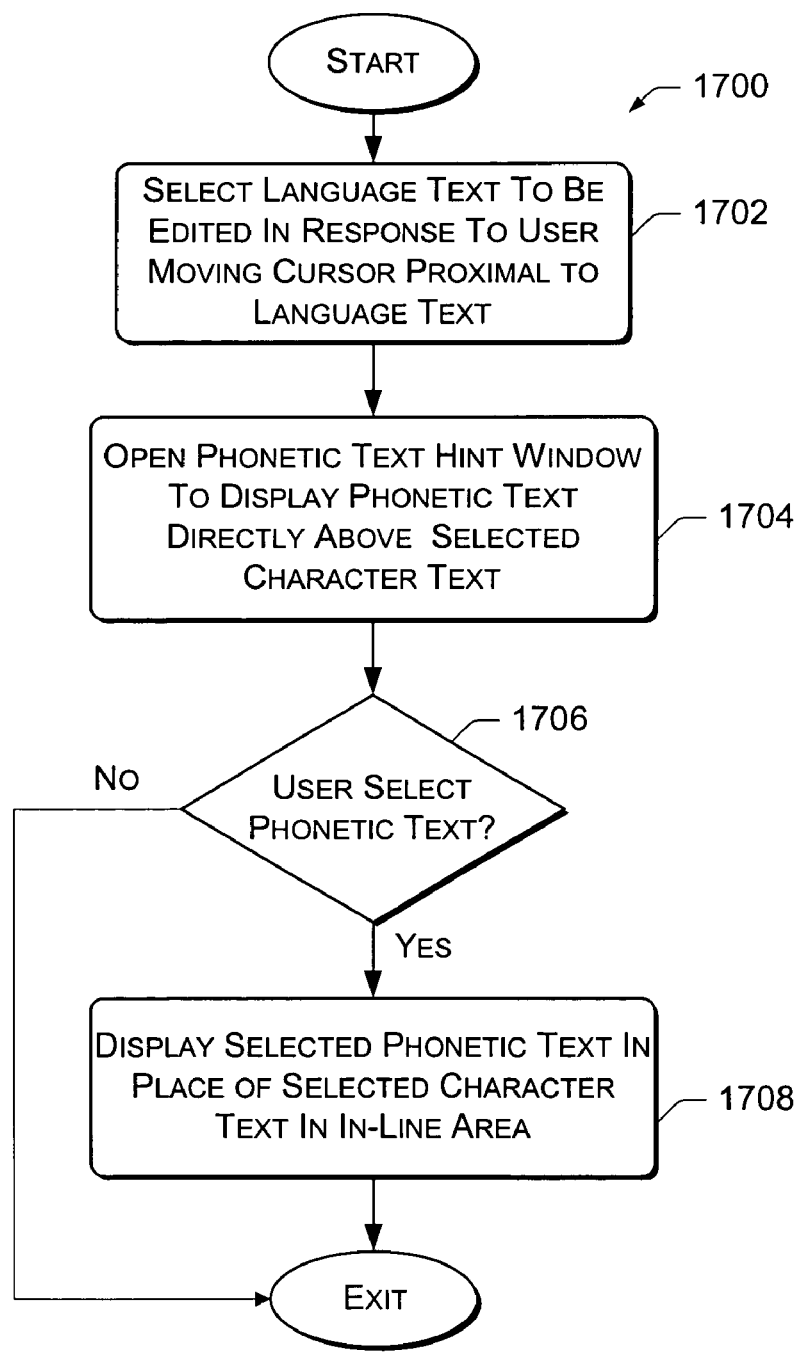
FIG. 17 is a flow diagram of a phonetic text hint sub-process.
Figure 18:
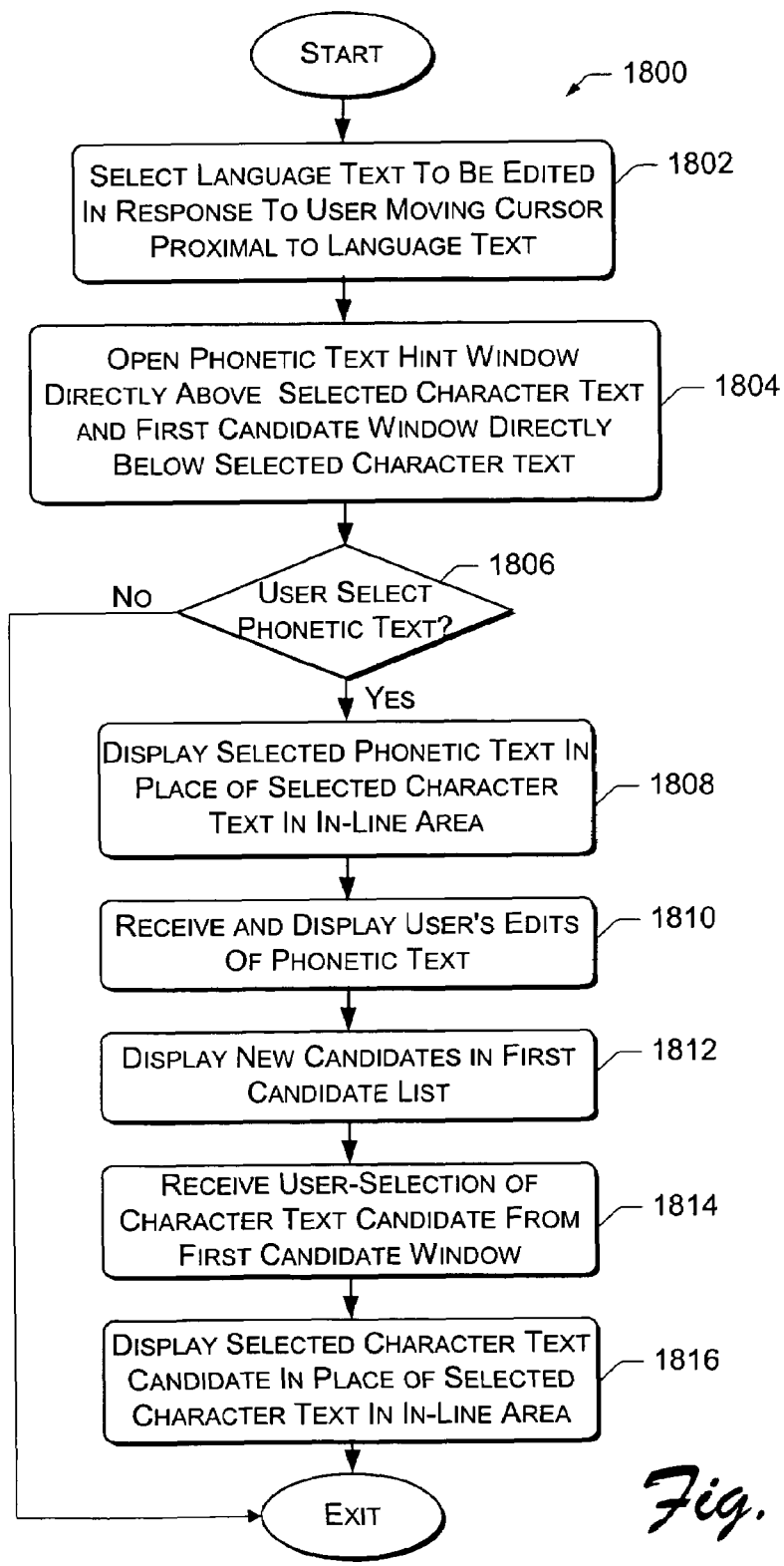
FIG. 18 is a flow diagram of an in-place phonetic text correction sub-process.

FIGS. 15-18 illustrate different implementations of an in-place error correction sub-process, which is an exemplary implementation of operations 1108-118 of FIG. 11. The sub-processes of FIGS. 15 and 16 concern use of the first and second candidate lists to correct language text. The sub-processes of FIGS. 17 and 18 are directed to correcting phonetic text using the phonetic text hint window.

FIG. 15 illustrates an in-place error correction sub-process 1500 that corrects converted language text by offering alternative language texts in a pop-up candidate window. Exemplary screen displays depicting this sub-process 1500 are illustrated in FIG. 5.

At operation 1502, in response to the user moving the cursor proximally to previously entered language text (e.g., in front of a character), the language input UI selects or identifies the language text to be edited. The UI opens the edit window 500, including the first candidate window 504 directly below the language text to be edited, to display a list of replacement candidates for the selected language text (operation 1504).

At operation 1506, the UI receives the user's selection of a replacement candidate from the first candidate window 504. The language input UI displays the selected replacement language text candidate in place of the selected language text within the same in-line area 202 (operation 1508). Operational flow then exits.

FIG. 16 illustrates an in-place error sub-process 1600 that corrects converted language text by offering a complete list of alternative language texts in a secondary, larger pop-up candidate window. Exemplary screen displays depicting this sub-process 1600 are illustrated in FIG. 6.

At operation 1602, in response to the user moving the cursor proximally to previously entered language text (e.g., in front of a character), the language input UI selects or identifies the language text to be edited. The UI opens the edit window 500, including the first candidate window 504 directly below the language text to be edited, to display a short list of replacement candidates for the selected language text (operation 1604). If the user cannot find an appropriate replacement candidate, the user may invoke a second candidate window 600 of replacement language text candidates (operation 1606). The second candidate list contains a larger or more complete list of replacement language text candidates than the first candidate window.

At operation 1608, the UI receives the user's selection of a replacement candidate from the second candidate window 600. The language input UI displays the selected replacement language text candidate in place of the selected language text within the same in-line area 202 (operation 1610). Operational flow then exits.

FIG. 17 illustrates an in-place error sub-process 1700 that corrects the converted language text by editing the previously entered phonetic text via a pop-up hint window. Exemplary screen displays depicting this sub-process 1700 are illustrated in FIG. 7.

At operation 1702, in response to the user moving the cursor proximally to previously entered language text (e.g., in front of a character), the language input UI selects or identifies the language text to be edited. The UI opens the edit window 500, including the phonetic text hint window 502 directly above the language text to be edited that displays the phonetic text as entered by the user (operation 1704).

Upon user selection of the phonetic text in the hint window 502 (i.e., the "yes" path from operation 1706), the UI displays the phonetic text in place of the language text being edited (operation 1708). This allows the user to make corrections to the phonetic text within the in-line area 202. Operational flow then exits.

FIG. 18 illustrates an in-place error sub-process 1800 that corrects the converted language text by editing the previously entered phonetic text and viewing a new set of candidates following the editing. Exemplary screen displays depicting this sub-process 1800 are illustrated in FIGS. 8 and 9.

At operation 1802, in response to the user moving the cursor proximally to previously entered language text (e.g., in front of a character), the language input UI selects or identifies the language text to be edited. The UI opens the edit window 500, including the phonetic text hint window 502 directly above the selected language text and the first candidate window 504 directly below the language text (operation 1804).

Upon user selection of the phonetic text in the hint window 502 (i.e., the "yes" path from operation 1806), the UI displays the phonetic text in place of the language text being edited (operation 1808). The UI receives and displays the user's edits of the phonetic text in the in-line edit area 202 (operations 1810). In response to the editing, the UI displays a new list of replacement language text candidates in the first candidate window 504 (operation 1812). The user may further invoke the second candidate window 600 if desired.

At operation 1814, the UI receives the user's selection of a replacement candidate from the new list in the first candidate window 504. The language input UI displays the selected replacement language text candidate in place of the selected language text within the same in-line area 202 (operation 1816). Operational flow then exits.

Multi-Language Entry

Figure 19:
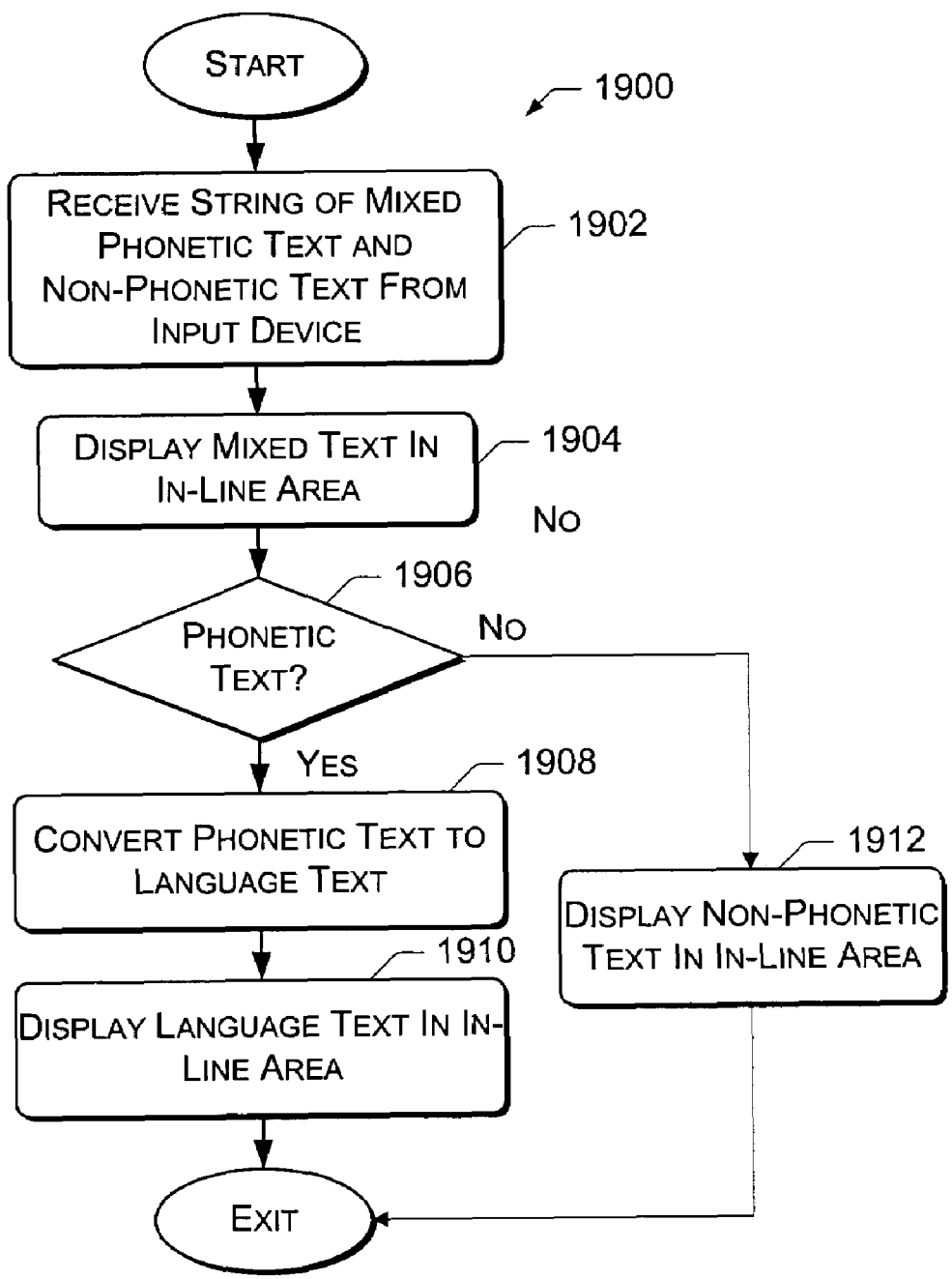
FIG. 19 is a flow diagram of an in-line inputting mixed language text sub-process.

FIG. 19 illustrates a multi-language entry sub-process 1900 in which two or more different languages are entered using the in-line input UI. Exemplary screen displays depicting this sub-process 1900 are illustrated in FIG. 10.

At operation 1902, the language input architecture receives a string of mixed phonetic and non-phonetic text input by the user via an input device. The language input UI displays the mixed text within the same in-line area 202 as the previously converted language text (operation 1904).

At operation 1906, the language input architecture determines whether the input text is phonetic text (e.g., Pinyin) as opposed to non-phonetic text (e.g., English). If the input text is phonetic text (i.e., the "yes" path from operation 1906), the language input architecture converts the phonetic text to language text (operation 1908). The UI displays the language text in place of the entered phonetic text and in-line with the previous text (operation 1910). On the other hand, if the input text is non-phonetic text (i.e., the "no" path from operation 1906), the language input architecture does not convert it and the UI displays the non-phonetic text in-line with the previous text (operation 1912). Operational flow then exits.

Exemplary Chinese-Based Implementation

FIGS. 20-26 illustrate an exemplary implementation of the language input architecture and UI in the context of the Chinese language. In this context, the phonetic text is Chinese Pinyin and the language text is Chinese Hanzi characters.

Figure 20:
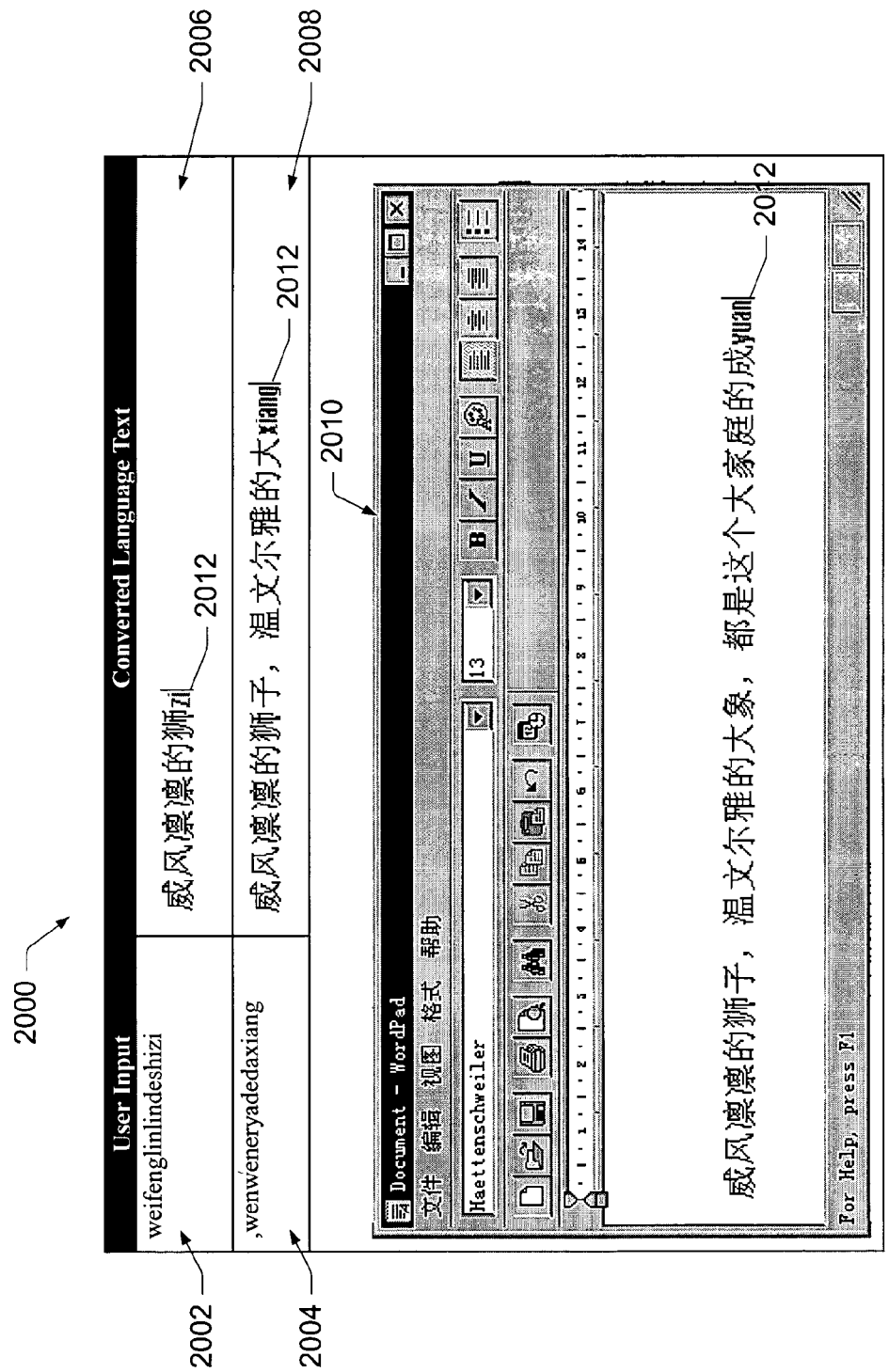
FIG. 20 illustrates exemplary user inputs and a resulting screen shots of an exemplary Chinese input user interface, which shows an example of an in-line input feature.

FIG. 20 illustrates one implementation of a Chinese input user interface showing an example of the in-line input feature. Table 2000 contains two strings of Pinyin text 2002 and 2004 input by the user and corresponding converted Hanzi text 2006 and 2008 as it would appear in the in-line input area. An exemplary display screen 2010 is shown below table 2000 and contains the converted Hanzi text 2008. Notice that the Pinyin text being input at a cursor bar 2012 is displayed in-line with the converted Chinese text. The other characteristics shown in the display screen 2010 are known in the word processing art.

Figure 21:
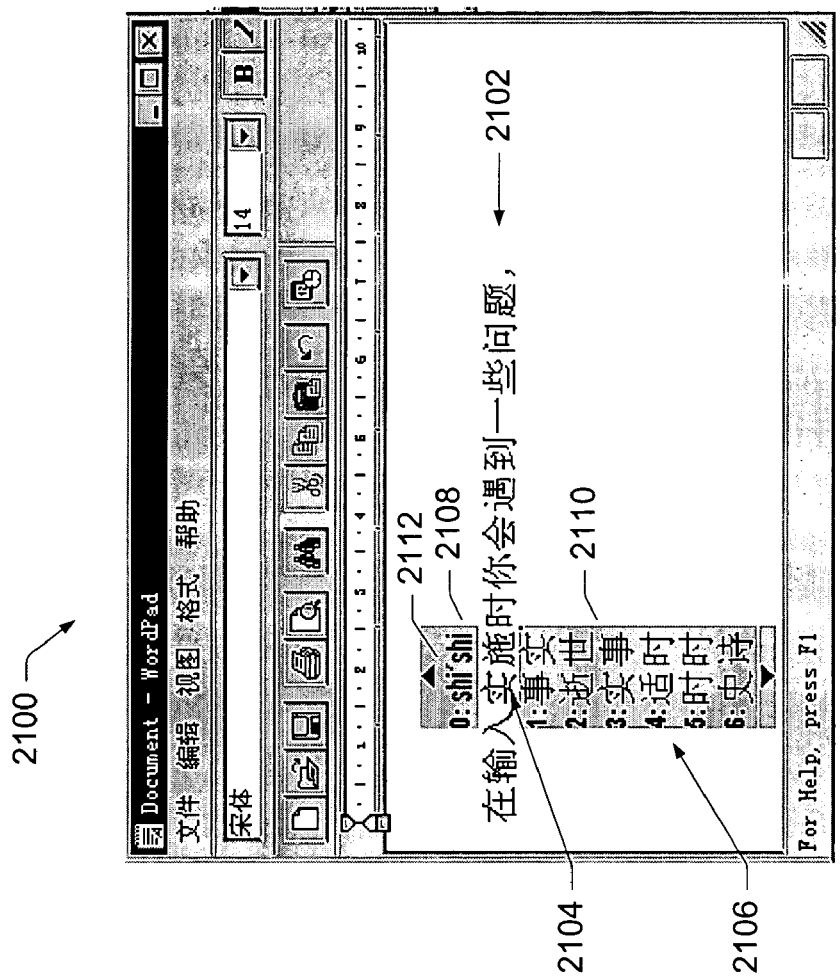
FIG. 21 illustrates an exemplary screen display of an exemplary Chinese input user interface, which shows an example of a Pinyin text hint feature.

FIG. 21 illustrates a Chinese UI screen 2100 in which converted Hanzi text is presently displayed in the in-line entry area 2102. The user has moved the cursor to select Chinese character text 2104 for editing and invoked the pop-up edit window 2106, consisting of a Pinyin text hint window 2108 and a first Hanzi text candidate window 2110. The Pinyin text 2112 associated with the selected Chinese character text 2104 is displayed in a Pinyin text hint window 2108.

Figure 22:
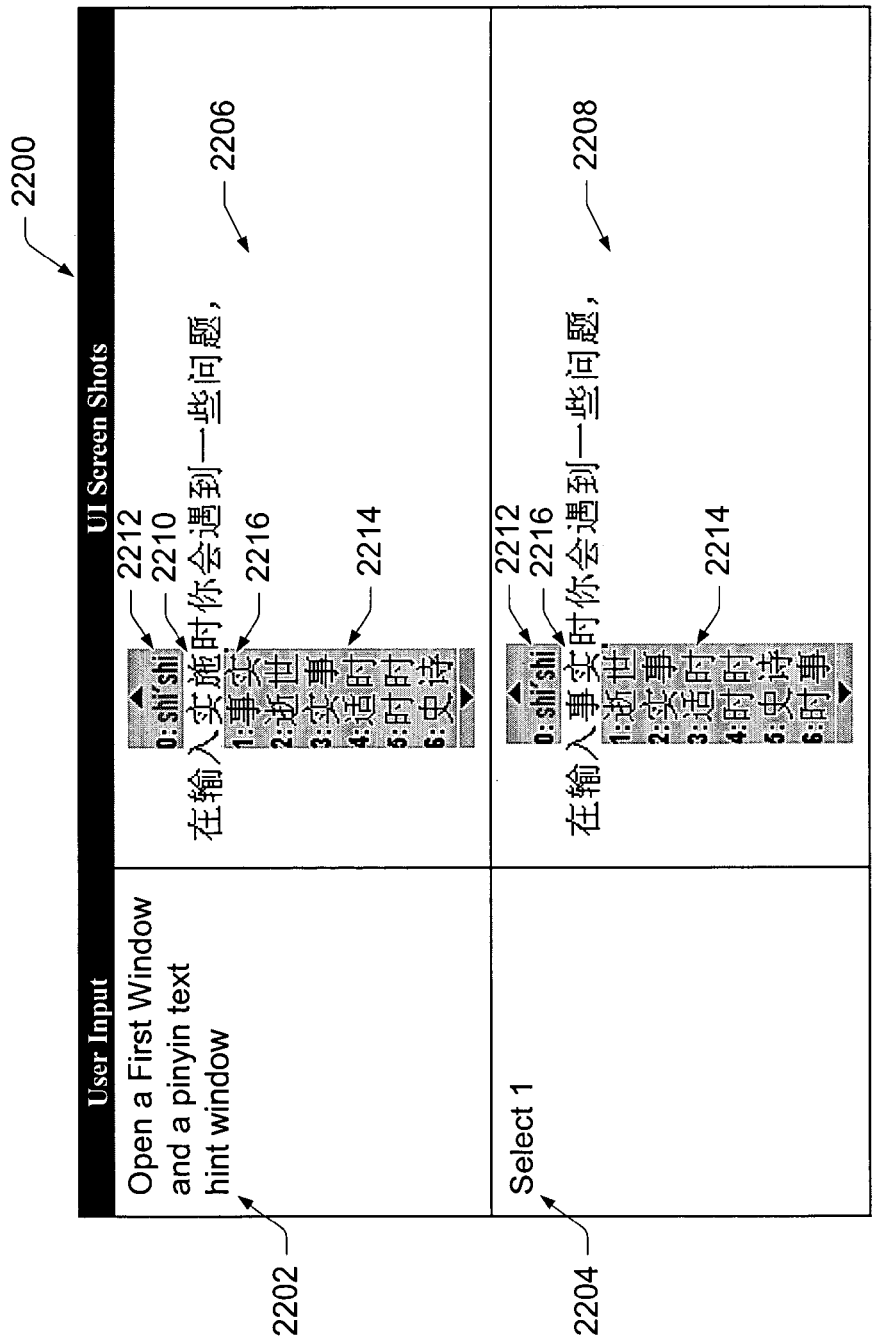
FIG. 22 illustrates exemplary user inputs and resulting screen shots of an exemplary Chinese input user interface, which shows an example of an in-place error correction feature.

FIG. 22 illustrates one implementation of a Chinese input user interface showing an example of the in-place error correction feature. Table 2200 depicts two user actions in the left column—an action 2202 to open the edit window containing a phonetic hint and a candidate list and an action 2204 to select an item "1" from the candidate list. In response to the user actions in the left column, the right column of table 2200 illustrates corresponding exemplary screen shots 2206 and 2208.

With respect to screen shot 2206, the user selects Chinese character text 2210 for editing by moving the cursor in front of the character text 2210. The user inputs a command to open an edit window containing a Pinyin text hint window 2212 and a first candidate list window 2214. Next, the user selects item "1" from the candidate list 2214 and the first candidate 2216 associated with item "1" is substituted for the original selected text 2210. Notice also that the candidates in the list 2208 are updated (i.e., scrolled upward one place) to reflect that the selected candidate 2216 is moved into the in-line entry area. The updating may be animated to visually illustrate that the selected candidate 2216 is moved into the in-line area.

FIG. 23 illustrates another implementation of a Chinese input user interface to illustrate in-place correction of the Pinyin text. The left column in table 2300 contains a series of five user actions 2302-2310 and the right column shows corresponding exemplary screen shots 2312-2320 resulting from the user actions.

When a user decides to edit the character text, the user moves the cursor to the front of the character text to be edited (action 2302). Suppose the user selects Chinese character text 2330 to be edited (UI screen shot 2312). After moving cursor in front of the character text 2330, the user inputs a command (e.g., pressing the "ESC" key) to invoke the edit window (action 2304). As a result, a Pinyin text hint window 2332 and a first candidate list window 2334 are opened as shown in the UI screen shot 2314.

Next, the user enters "0" (action 2306) to select the Pinyin text 2336 in the Pinyin text hint window 2332. The selected Pinyin text 2336 is substituted for the selected character text 2330 as shown in the UI screen shot 2316. At this point, the user is free to edit the original Pinyin text.

Suppose the user adds an additional apostrophe in the Pinyin text 2336 (action 2308) to produce text 2336' as shown UI screen shot 2318. The edited Pinyin text 2336' is shown both in the in-line area as well as the Pinyin text hint window 2332. Following the editing, the first candidate window 2334 is updated with a new list of character text candidates. In this example, a new character text candidate 2338 corresponding to the edited Pinyin text 2336' is displayed in the first candidate list window 2334.

Finally, the user selects the desired character text 2338 in the first candidate list window 2334, for example, by entering "1" (action 2310). As a result, the selected character text 2338 is displayed in place of the edited Pinyin text 2336', as illustrated in UI screen shot 2320. In this manner, the new character text 2338 is effectively substituted for the original language text 2330.

FIG. 24 illustrates another implementation of a Chinese input user interface to illustrate entry of mixed languages, such as Chinese and English. The left column in table 2400 contains a series of two user actions 2402 and 2404 and the right column shows corresponding exemplary screen shots 2406 and 2408 resulting from the user actions.

Suppose the user inputs mixed Pinyin text 2410 and English text 2412 as indicated by action 2402. The user can enter the mixed text into the language input UI without shifting modes between Chinese entry and English entry. That is, the user simply enters the Pinyin text and English text in the same line without stopping. The Pinyin text 2410 is converted into Chinese text 2414 and displayed within the same in-line area, as illustrated in UI screen shot 2406. The English text 2412 is not converted by the language input architecture, but is displayed as entered.

Subsequently, the user inputs mixed Pinyin text 2416, English text 2418, and Pinyin text 2420 without shifting modes (action 2404). The Pinyin text 2416 and 2420 are converted into Chinese text 2422 and 2424, respectively, as shown in UI screen shot 2408. The English text 2418 remains unchanged and is displayed in-line with the converted Chinese text.

According to one implementation, the phonetic and non-phonetic text may be displayed differently to differentiate between them. For example, compare the mixed text in table 2000 of FIG. 20 and table 2400 of FIG. 24. The Pinyin text (e.g., 2012 in FIG. 20) is displayed in a narrow, bold font, whereas the English text (e.g., 2412 or 2418 in FIG. 24) is displayed in a thin, courier-type font.

Figure 25:
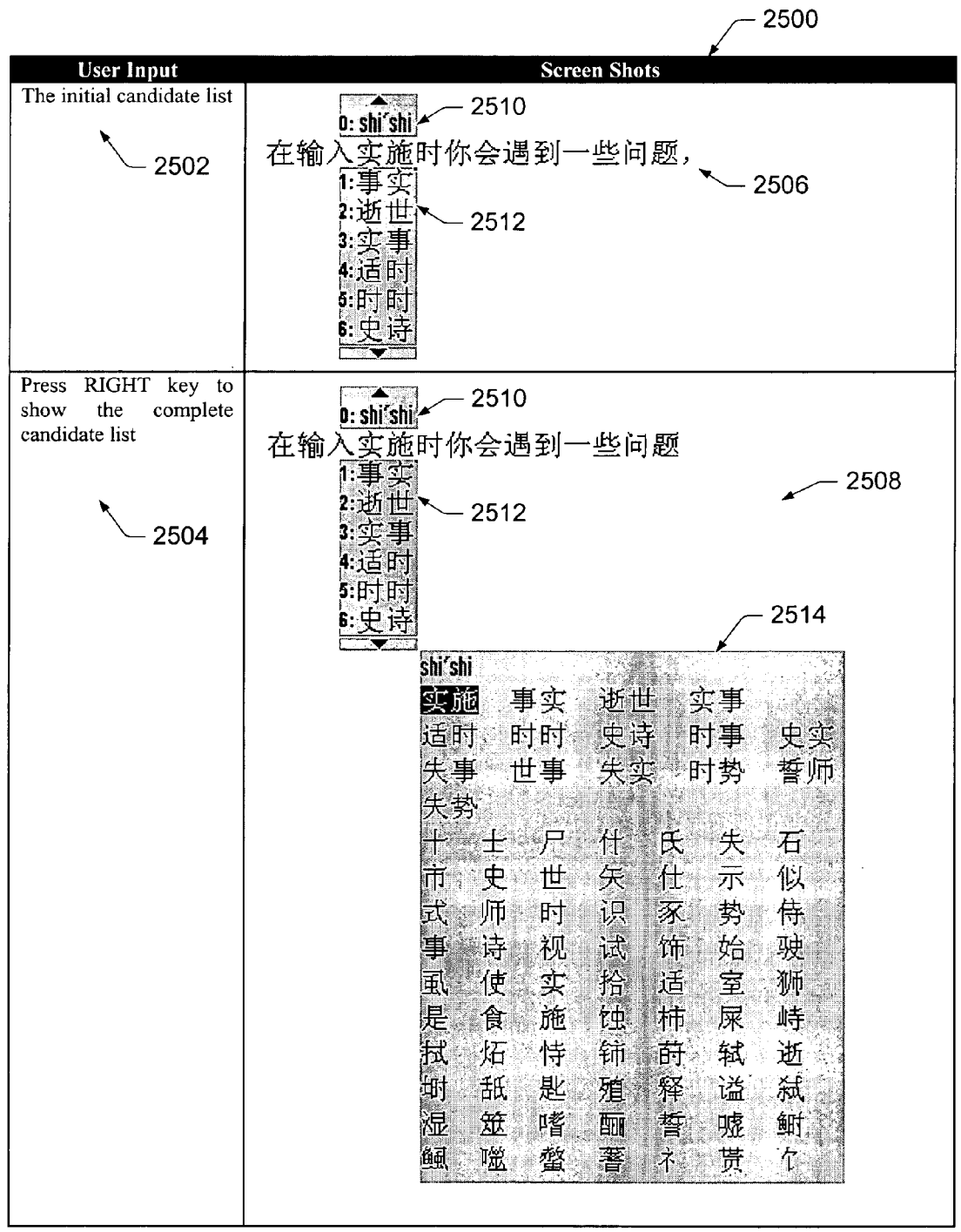
FIG. 25 illustrates exemplary user inputs and resulting screen shots of an exemplary Chinese input user interface, which shows an example of a second candidate list feature.

FIG. 25 illustrates another implementation of a Chinese input user interface to illustrate the first and second candidate lists for in-place editing. The left column in table 2500 contains a series of two user actions 2502 and 2504 and the right column shows corresponding exemplary screen shots 2506 and 2508 resulting from the user actions.

At action 2502, the user selects a Chinese text to be edited and inputs a command to open the Pinyin text hint window 2510 and a first character text candidate list 2512. The windows 2510 and 2512 appear above and below the in-line entry area, respectively, as illustrated in UI screen shot 2506.

Next, at action 2504, the user inputs a command to open a second character text candidate list. A second character text candidate list window 2514 is popped open next to the first candidate list 2512, as illustrated in UI screen shot 2508. The user may then select a character text candidate from the second character text candidate list window 2514.

Figure 26:
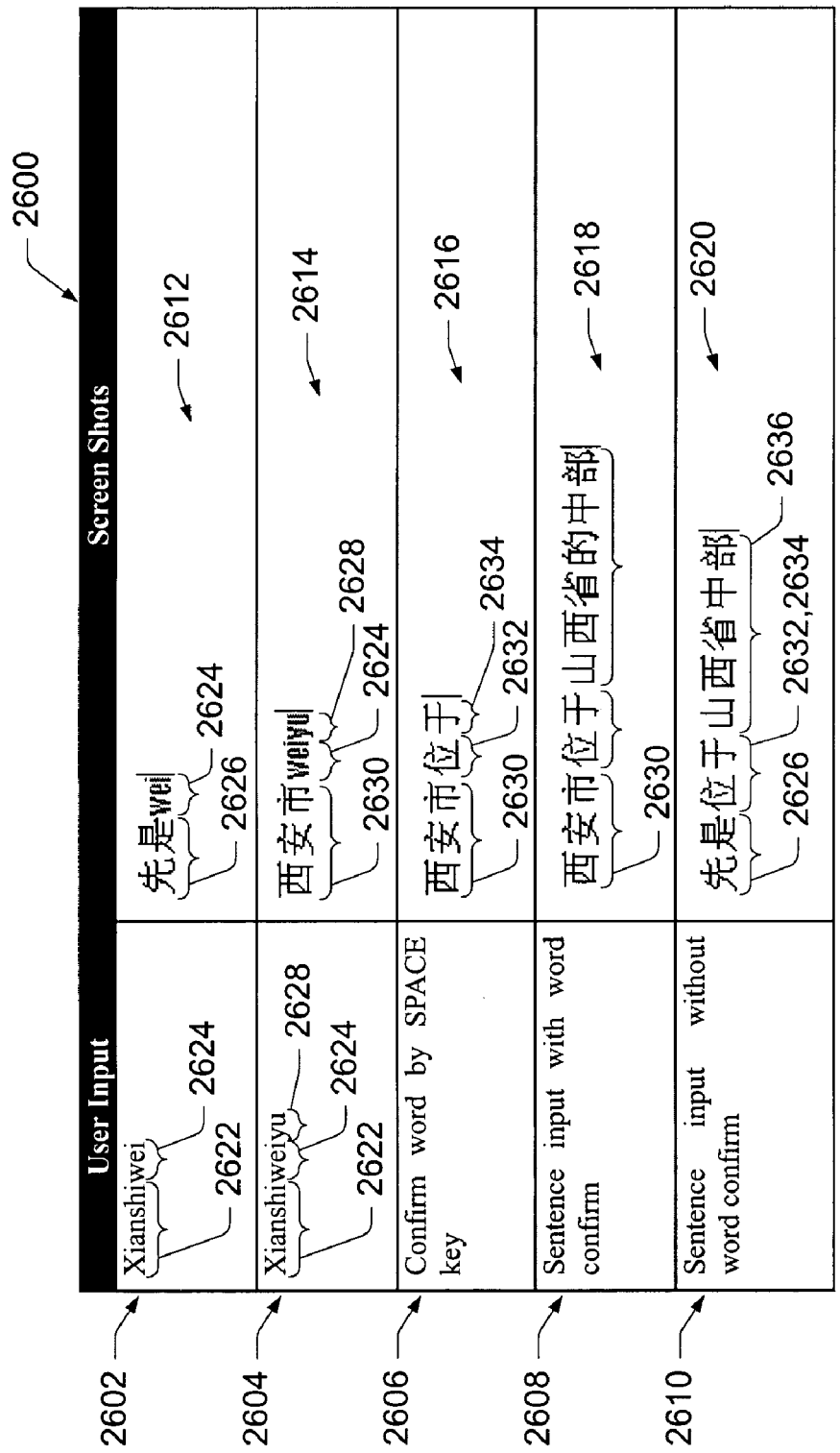
FIG. 26 illustrates exemplary user inputs and resulting screen shots of an exemplary Chinese input user interface, which shows an example of a sentence-based automatic conversion with a character confirmation feature.

FIG. 26 illustrates another implementation of a Chinese input user interface to illustrate sentence-based automatic conversion with confirmed character text. The left column in table 2600 contains a series of five user actions 2602-2610 and the right column shows corresponding exemplary screen shots 2612-2620 resulting from the user actions.

At action 2602, the user inputs Pinyin text 2622 and 2624. The Pinyin text 2622 is automatically converted into character text 2626 and Pinyin text 2624 remains unconverted until further user input, as illustrated by UI screen shot 2612. At action 2604, the user subsequently inputs Pinyin text 2628. The previously converted character text 2626 is now automatically converted into different Chinese character text 2630 as a result of changing context introduced by the addition of Pinyin text 2628. This modification of the converted character text is illustrated in UI screen shot 2614. Pinyin text 2624 and 2628 remain unconverted at this point, and continue to be illustrated in-line with the modified language text.

Next, at action 2606, the user inputs a confirmation command (e.g., pressing the space bar) to confirm the just converted character text 2630. Meanwhile, the Pinyin text 2624 and 2628 are automatically converted into Chinese text 2632 and 2634, respectively, based on the context in the sentence so far. This is illustrated in screen shot 2616.

Subsequently, at action 2608, the user enters additional Pinyin text (not shown) in the same sentence and the Pinyin text is converted into character text 2636, as illustrated in UI screen shot 2618. Notice that the confirmed character text 2630 is not changed by subsequent entry of the Pinyin text.

For the comparison purposes, suppose the character text 2630 is not confirmed by user action 2606 (e.g., the user does not press the space bar). Instead, the user enters the additional Pinyin text without confirmation of character text 2630. In this case, the character text 2626 remains unchanged and is not modified to text 2630, as illustrated by UI screen shot 2620. This is because the automatic conversion from Pinyin text to character text is sentence-based and character text 2626 is part of the sentence. As long as the sentence is active (i.e., no punctuation has ended the sentence or no new sentence has yet been started), the previously converted character text in the current sentence is subject to further modification unless the user confirms the converted character text.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A language input user interface comprising:
a line-based entry area to display on a display device associated with a computer system;
an input text displayed within the line-based entry area; and
an output text, converted from the input text, wherein the output text replaces the input text from which the output text was converted as each portion of the input text is converted, the output text displayed together with unconverted input text within the line-based entry area in at least one continuous string of text, the at least one continuous string of text composed of the output text and the unconverted input text.

2. A language input user interface as recited in claim 1, wherein the input text comprises a phonetic text and the output text comprises a character-based language text.

3. A language input user interface as recited in claim 1, wherein the input text comprises Chinese Pinyin and the output text comprises Chinese Hanzi.

4. A language input user interface as recited in claim 1, wherein the line-based entry area is oriented horizontally.

5. A language input user interface as recited in claim 1, wherein the output text replaces the input text from which the output text was converted one of:
  automatically when the input text is translated; and
  after the translation is manually accepted by a user.

6. A language input user interface as recited in claim 1, wherein the output text is further modified as additional input text is entered.

7. A language input user interface as recited in claim 1, wherein the output text is rendered fixed in response to user entry of punctuation.

8. A language input user interface as recited in claim 1, wherein the output text is rendered fixed in response to user confirmation of the output text.

9. A language input user interface as recited in claim 1, further comprising editing means for editing the output text within the line-based entry area without switching from an entry mode to an edit mode.

10. A language input user interface as recited in claim 1, further comprising an edit window, invokable by a user, positioned adjacent to particular output text to be edited.

11. A language input user interface as recited in claim 1, wherein the line-based entry area is oriented in a first direction and further comprising an edit window positioned adjacent to the line-based entry area and oriented in a second direction orthogonal to the first direction.

12. A language input user interface as recited in claim 1, further comprising an input text hint, invokable by a user, positioned adjacent to line-based entry area near selected output text to be edited, the input text hint window containing the input text from which the selected output text was converted.

13. A language input user interface as recited in claim 1, further comprising a candidate list, invokable by a user, positioned adjacent to line-based entry area near selected output text to be edited, the candidate list containing one or more alternate output text candidates that may be substituted for the selected output text.

14. A language input user interface as recited in claim 13, wherein the output text candidates are ordered within the candidate list according to a ranking.

15. A language input user interface as recited in claim 13, wherein the candidate list is scrollable and the output candidates are animated during scrolling.

16. A language input user interface as recited in claim 1, further comprising:
  first and second candidate lists invokable by a user;
  the first candidate list containing one or more alternate output text candidates that may be substituted for the selected output text; and
  the second candidate list containing a complete set of output text candidates than the first candidate list.

17. A language input user interface as recited in claim 16, wherein the output text candidates in the second candidate list are arranged according to complexity of character construction.

18. A language input user interface as recited in claim 16, wherein the output text candidates are ordered within the first candidate list according to a first metric and the output text candidates are arranged in the second candidate list according to a second metric different than the first metric.

19. A language input user interface as recited in claim 1, wherein the line-based entry area is oriented in a first direction, and further comprising:
  an input text hint positioned above the line-based entry area near selected output text to be edited and oriented in a second direction orthogonal to the first direction, the input text hint containing the input text from which the selected output text was converted; and
  a candidate list positioned below the line-based entry area near the selected output text to be edited, the candidate list containing one or more alternate output text candidates that may be substituted for the selected output text.

20. A language input user interface as recited in claim 1, wherein the input text contains phonetic and non-phonetic text and the output text, phonetic input text and non-phonetic input text are displayed together within the line-based entry area.

21. A word processor comprising the language input user interface as recited in claim 1.

22. A language input architecture comprising:
  a user interface to enable a user to enter an input text;
  a language conversion unit to convert the input text to an output text; and
  the user interface being configured to display the converted output text in-line with unconverted input text in at least one continuous string of text, the at least one continuous string of text to be composed of the converted output text and the unconverted input text, wherein the output text is substituted for the input text from which the output text was converted as each portion of the input text is converted.

23. A language input architecture as recited in claim 22, wherein the input text comprises a phonetic text and the output text comprises a character-based language text.

24. A language input architecture as recited in claim 22, wherein the input text comprises Chinese Pinyin and the output text comprises Chinese Hanzi.

25. A language input architecture as recited in claim 22, wherein the user interface presents the output text and unconverted input text within a common horizontal line.

26. A language input architecture as recited in claim 22, wherein the language conversion unit continues to modify the output text as additional input text is entered, the user interface changing the output text as the output text is modified.

27. A language input architecture as recited in claim 22, wherein the user interface enables a user to edit the output text without switching from an entry mode to an edit mode.

28. A language input architecture as recited in claim 22, wherein the user interface presents the output text and unconverted input text within a common line oriented in a first direction and further presents an edit window near selected output text to be edited, the edit window being oriented in a second direction orthogonal to the first direction.

29. A language input architecture as recited in claim 22, wherein the user interface presents an input text hint containing the input text from which the selected output text was converted.

30. A language input architecture as recited in claim 22, wherein the user interface presents a candidate list containing one or more alternate output text candidates that may be substituted for the selected output text.

31. A language input architecture as recited in claim 22, wherein the user interface presents first and second candidate lists, the first candidate list containing one or more alternate output text candidates that may be substituted for the selected output text and the second candidate list containing a complete set of output text candidates than the first candidate list.

32. A language input architecture as recited in claim 22, wherein the input text contains phonetic and non-phonetic text, further comprising:

the language conversion unit is configured to convert the phonetic text to language text while leaving the non-phonetic text unconverted; and the user interface is configured to display the language text, unconverted phonetic text, and the non-phonetic text in-line with one another.

33. A word processor comprising the language input architecture as recited in claim 22.

34. One or more computer-recordable media storing computer-executable instructions that, when executed on a processor, cause a computer to:

receive an input string of phonetic text;

convert the input string of phonetic text to an output string of language text; and display the language text and unconverted phonetic text in-line together in at least one continuous string of text within a line-based entry area, the at least one continuous string of text composed of the language text and the unconverted phonetic text, wherein the language text replaces the phonetic text from which the language text was converted as each portion of the phonetic text is converted.

35. One or more computer-recordable media storing computer-executable instructions that, when executed on a processor, cause a computer to:

receive an input string of phonetic text and non-phonetic text;

convert the phonetic text to language text; and display the language text, non-phonetic text, and unconverted phonetic text in-line together in at least one continuous string of text within a line-based entry area, the at least one continuous string of text composed of the language text, the non-phonetic text, and the unconverted phonetic text, wherein the language text replaces the phonetic text from which the language text was converted as each portion of the phonetic text is converted.

* * * * *

UNITED STATES PATENT AND TRADEMARK OFFICE
CERTIFICATE OF CORRECTION

| | | |
|---|---|---|
| PATENT NO. | : 7,403,888 B1 | Page 1 of 1 |
| APPLICATION NO. | : 09/606811 | |
| DATED | : July 22, 2008 | |
| INVENTOR(S) | : Jian Wang et al. | |

It is certified that error appears in the above-identified patent and that said Letters Patent is hereby corrected as shown below:

In column 5, line 54, before "The" insert -- 106. --.

In column 6, line 61, before "also" insert -- is --.

Signed and Sealed this
Third Day of May, 2011

David J. Kappos
*Director of the United States Patent and Trademark Office*